(12) United States Patent
Kim et al.

(10) Patent No.: US 10,605,645 B2
(45) Date of Patent: Mar. 31, 2020

(54) FUEL TANK FOR VEHICLE

(71) Applicant: COAVIS, Sejong-si (KR)

(72) Inventors: In Gon Kim, Sejong-si (KR); Se Jin Kim, Sejong-si (KR); Jong Hyuk Yoon, Sejong-si (KR)

(73) Assignee: COAVIS, Sejong-si (KR)

( * ) Notice: Subject to any disclaimer, the term of this patent is extended or adjusted under 35 U.S.C. 154(b) by 169 days.

(21) Appl. No.: 15/822,598

(22) Filed: Nov. 27, 2017

(65) Prior Publication Data

US 2018/0156653 A1  Jun. 7, 2018

(30) Foreign Application Priority Data

Dec. 6, 2016 (KR) .................. 10-2016-0165320

(51) Int. Cl.
| | | |
|---|---|---|
| G01F 23/296 | (2006.01) | |
| B60K 15/03 | (2006.01) | |
| F02M 37/00 | (2006.01) | |
| G01F 23/00 | (2006.01) | |
| G01F 23/30 | (2006.01) | |

(52) U.S. Cl.
CPC .......... *G01F 23/2962* (2013.01); *B60K 15/03* (2013.01); *B60K 15/03006* (2013.01); *F02M 37/0076* (2013.01); *G01F 23/0069* (2013.01); *G01F 23/0076* (2013.01); *G01F 23/2966* (2013.01); *G01F 23/303* (2013.01); *B60K 2015/0321* (2013.01); *B60K 2015/03217* (2013.01); *B60K 2015/03223* (2013.01); *B60K 2015/03243* (2013.01); *B60K 2015/03453* (2013.01); *B60K 2015/03467* (2013.01)

(58) Field of Classification Search
CPC ............. G01F 23/2962; G01F 23/2966; G01F 23/303; B60K 2015/3217; B60K 2015/03453; B60K 2015/03467
See application file for complete search history.

(56) References Cited

U.S. PATENT DOCUMENTS

| | | | |
|---|---|---|---|
| 2004/0079149 A1* | 4/2004 | Sawert .................. | B06B 1/0292 73/290 V |
| 2006/0144139 A1* | 7/2006 | Miyagawa .......... | G01F 23/2962 73/290 V |
| 2008/0184970 A1* | 8/2008 | Igarashi ............... | F02M 37/103 123/509 |
| 2010/0097892 A1* | 4/2010 | Aughton ............. | G01F 23/2962 367/99 |
| 2012/0325335 A1* | 12/2012 | Schalkx .............. | F16L 37/2445 137/315.01 |

FOREIGN PATENT DOCUMENTS

| | | |
|---|---|---|
| JP | 4365306 B2 | 11/2009 |
| JP | 4421906 B2 | 2/2010 |
| KR | 2019970041534 U | 7/1997 |
| KR | 1020120137471 A | 12/2012 |
| KR | 101413247 B1 | 6/2014 |

* cited by examiner

*Primary Examiner* — Paul M. West
(74) *Attorney, Agent, or Firm* — The Webb Law Firm

(57) ABSTRACT

Provided is a fuel tank for a vehicle in which a fuel measure bar provided in a vertical direction in a fuel storing body in which a fuel combusted in an engine is stored and capable of measuring a fuel amount using an ultrasonic wave includes a first fuel measure bar fixed to a bottom surface of the fuel storing body and a second fuel measuring bar easily coupled to the first fuel measuring bar to easily enter the fuel storing body and exit from the fuel storing body.

9 Claims, 17 Drawing Sheets

Prior Art

Prior Art

FIG. 14 a) A PLURALITY OF TOFS

| 136 | 132 | 0 | 135 | 0 | 133 | 18 | 137 | b) ARRANGE AND CORRECT

| 137 | 136 | 135 | 133 | 132 | 18 | 0 | 0 | c) CALCULATE LIQUID LEVEL INFORMATION

| 137 | 136 | 135 | 133 | 132 | 18 |

AVERAGE VALUE d) REPEATEDLY PERFORM

INSERT NEW TOF → | 134 | 136 | 132 | 0 | 135 | 0 | 133 | 18 | → DELETE EXISTING TOF

FUEL TANK FOR VEHICLE

CROSS-REFERENCE TO RELATED APPLICATION

This application claims priority to Korean Patent Application No. 10-2016-0165320 filed Dec. 6, 2016, the disclosure of which is hereby incorporated in its entirety by reference.

TECHNICAL FIELD

The following disclosure relates to a fuel tank for a vehicle, and more particularly, to a fuel tank for a vehicle in which a fuel measure bar provided in a vertical direction in a fuel storing body in which a fuel combusted in an engine is stored and capable of measuring a fuel amount using an ultrasonic wave includes a first fuel measure bar fixed to a bottom surface of the fuel storing body and a second fuel measuring bar easily coupled to the first fuel measuring bar to easily enter the fuel storing body and exit from the fuel storing body.

BACKGROUND

A fuel tank for a vehicle, which is an apparatus storing a fuel combusted in an engine, may include a fuel storing body in which the fuel is stored, a fuel inlet, a fuel pump provided in the fuel storing body and supplying the fuel stored in the fuel storing body to the engine, and fuel measuring portions such as a fuel measuring bar, and the like, capable of measuring a fuel amount stored in the fuel storing body.

In addition, the fuel storing body may include a flange hole, which is a hole for assembling and replacing devices such as the fuel pump, the fuel measuring bar, and the like, and the flange hole is formed to be closable by a flange lid.

Here, a fuel channel supplying the fuel to the engine by an operation of the fuel pump, a pressure sensor measuring an internal pressure of the fuel storing body, and the like, are formed to be assembled to the flange lid, such that the flange lid may perform a fuel supplying operation while closing the fuel storing body.

The fuel measuring bar, which is one of the fuel measuring portions described above, includes a hollow in which the fuel is filled, and is formed in a vertical direction in the fuel storing body.

The fuel measuring bar may measure the fuel amount stored in the fuel storing body using various methods such as a differential pressure method, an ultrasonic method, and the like, in the hollow in which the fuel is filled.

Related Art Document, Korean Patent Publication No. 10-1413247 (entitled "Fuel Level Detecting Device Comprising Differential Pressure Sensor and published on Jun. 23, 2014) discloses a differential sensor unit provided in a fuel tank for a vehicle and measuring an amount or a level of a fuel, which is schematically illustrated in FIG. 1.

However, as illustrated in FIG. 1, in the case of a fuel tank for a vehicle in which a flange hole is formed in an upper portion of a fuel storing body, a fuel pump and a fuel measuring bar are easily assembled and replaced through the flange hole formed in the upper portion of the fuel storing body, while as illustrated in FIG. 2, in the case of a fuel tank for a vehicle in which a flange hole 11 is formed in an upper portion of a side surface of a fuel storing body 10, a height of a fuel measuring bar 22 is higher than that of the flange hole 11, such that assembling and replacement of the fuel measuring bar 22 are inconvenient, and the replacement of the fuel measuring bar may also be impossible in the extreme case.

In addition, in order to vertically form the fuel measuring bar 22 in the fuel storing body 10, the fuel measuring bar 22 obliquely enters the fuel storing body 10 at a predetermined angle through the flange hole 11, and it is thus difficult to accurately fix the fuel measuring bar 22 having a length longer than a position of the flange hole 11 to a bottom surface of the fuel storing body 10 or replace the fuel measuring bar 22. (12: flange lid, 21: fuel pump)

RELATED ART DOCUMENT

Patent Document (Patent Document 1) Korean Patent Publication No. 10-1413247 (entitled "Fuel Level Detecting Device Comprising Differential Pressure Sensor and published on Jun. 23, 2014)

SUMMARY

An embodiment of the present invention is directed to providing a fuel tank for a vehicle in which a fuel measure bar provided in a vertical direction in a fuel storing body in which a fuel combusted in an engine is stored and capable of measuring a fuel amount using an ultrasonic wave includes a first fuel measure bar fixed to a bottom surface of the fuel storing body and a second fuel measuring bar easily coupled to the first fuel measuring bar to easily enter the fuel storing body and exit from the fuel storing body.

In one general aspect, a fuel tank for a vehicle includes: a fuel storing body 100 in which a fuel is stored; and a fuel supplying unit 200 including a fuel pump 210 provided in the fuel storing body 100 and supplying the fuel to an engine through a fuel channel 211 connected to the engine and a fuel measuring bar 220 formed in a vertical direction at one side of the fuel pump 210 and measuring a fuel amount in the fuel storing body 100 using an ultrasonic wave, wherein the fuel measuring bar 220 includes: a first fuel measuring bar 221 including a first fuel measuring bar body 221-1 including a first fuel measuring path 221-2 formed to be hollowed, and an ultrasonic sensor unit 221-3 disposed at a lower end of the first fuel measuring bar body 221-1, including an ultrasonic sensor, formed to be fixed to a bottom surface of the fuel storing body 100; and a second fuel measuring bar 222 including a second fuel measuring bar body 222-1 having a lower end formed to be coupled to an upper end of the first fuel measuring bar body 221-1 and including a second fuel measuring path 222-2 hollowed so as to be in communication with the first fuel measuring path 221-2 and forming a fuel measuring path 220-2 by coupling to the first fuel measuring path 221-2. From an inspection of FIGS. 4A-5, it is apparent that a decoupling space is formed above the second fuel measuring bar 222 to decouple and couple the second fuel measuring bar 222 in the fuel storing body 100. The decoupling space has a vertical length greater than a length of the lower insertion portion of the second fuel measuring bar body 222-1.

The first fuel measuring bar 221 may include a fitting portion 221-4 formed at the upper end of the first fuel measuring bar body 221-1 and including fitting grooves 221-4a formed in an outer peripheral surface of the first fuel measuring path 221-2, and the second fuel measuring bar 222 may include a sliding portion 222-4 formed at the lower end of the second fuel measuring bar body 222-1 and including sliding protrusions 222-4a formed on an outer peripheral surface of the second fuel measuring path 222-2 so as to be fitted into the fitting grooves 221-4a.

The sliding portion 222-4 may have two or more sliding protrusions 222-4a formed at both sides thereof in a horizontal direction so as to protrude in a downward direction, and the fitting grooves 221-4a of the fitting portion 221-4 may have a shape corresponding to that of the sliding protrusions 222-4a.

The fuel supplying unit 200 may further include a fixing portion 230 including a fuel pump fixing portion 231 and a fuel measuring bar fixing portion 232, the fuel pump fixing portion 231 being formed at one side of the fuel pump 210 facing the fuel measuring bar 220, and the fuel measuring bar fixing portion 232 being formed at one side of the second fuel measuring bar 222 facing the fuel pump fixing portion 231 so as to be fixed to the fuel pump fixing portion 231.

The fuel pump fixing portion 231 may include a guide path 231-1 formed in the vertical direction and a fixing jaw 231-2 formed at a lower side of the guide path 231-1 to protrude toward the fuel measuring bar 220, and the fuel measuring bar fixing portion 232 may include a tongs body 232-1 having a shape corresponding to that of the guide path 231-1 to be fitted into the guide path 231-1 and a fixing protrusion 232-2 formed at a distal end of the tongs body 232-1 and formed to be fixed to the fixing jaw 231-2.

The fitting portion 221-4 may include an elastic portion 221-4b formed on a lower surface of the fitting groove 221-4a and made of an elastic material.

The fuel measuring path 222-2 may have a predetermined angle so that a diameter thereof in a horizontal direction becomes wide toward an upward direction.

The fuel supply unit 200 may further include a bracket portion 240 including a first bracket portion 241 and a second bracket portion 242, the first bracket portion 241 including a first bracket 241-1 formed on the bottom surface of the fuel storing body 100 so that a lower end of the fuel pump 210 is fixed thereto, and the second bracket portion 242 including a second bracket 242-1 formed on the bottom surface of the fuel storing body 100 so that a lower end of the ultrasonic sensor unit 221-3 is fixed thereto.

The first bracket portion 241-1 may include a first bracket auxiliary portion 241-2 extended in an upward direction so as to surround the fuel pump 210, and the second bracket portion 242 may include a second bracket auxiliary portion 241-2 extended in the upward direction so as to surround the ultrasonic sensor unit 221-3.

BRIEF DESCRIPTION OF THE DRAWINGS

FIG. 14 is an illustrative view illustrating processes of measuring a liquid level of the method for optimizing driving of an ultrasonic sensor according to the present invention.

[Detailed Description of Main Elements]

| | |
|---|---|
| 1000: fuel tank for vehicle | |
| 100: fuel storing body | |
| 110: flange hole | 120: flange lid |
| 200: fuel supplying unit | |
| 210: fuel pump | 211: fuel channel |
| 220: fuel measuring bar | 220-2: fuel measuring path |
| 221: first fuel measuring bar | |
| 221-1: first fuel measuring bar body | 221-2: first fuel measuring path |
| 221-3: ultrasonic sensor unit | 221-4: fitting portion |
| 221-4a: fitting groove | 221-4b: elastic portion |
| 222: second fuel measuring bar | |
| 222-1: second fuel measuring bar body | 222-2: second fuel measuring path |
| 222-4: slide portion | 222-4a: slide protrusion |
| 230: fixing portion | |
| 231: fuel pump fixing portion | |
| 231-1: guide path | 231-2: fixing jaw |
| 232: fuel measuring bar fixing portion | |
| 232-1: tongs body | 232-2: fixing protrusion |
| 232-3: locking clip | |
| 240: bracket portion | |
| 241: first bracket portion | |
| 241-1: first bracket | 241-2: first bracket auxiliary portion |
| 242: second bracket portion | |
| 242-1: second bracket | 242-2: second bracket auxiliary portion |

DETAILED DESCRIPTION OF EMBODIMENTS

Hereinafter, a fuel tank for a vehicle according to the present invention will be described in detail with reference to the accompanying drawings.

Terms and words used in the present specification and claims are not to be construed as a general or dictionary meaning, but are to be construed as meaning and concepts meeting the technical ideas of the present invention based on a principle that the present inventors may appropriately define the concepts of terms in order to describe their inventions in the best mode.

Therefore, configurations described in exemplary embodiments of the present specification and illustrated in the accompanying drawings are merely the most preferable embodiments. Therefore, the present invention should be construed as including all the changes, equivalents, and substitutions included in the spirit and scope of the present invention at the time of filing this application.

Figure 1:
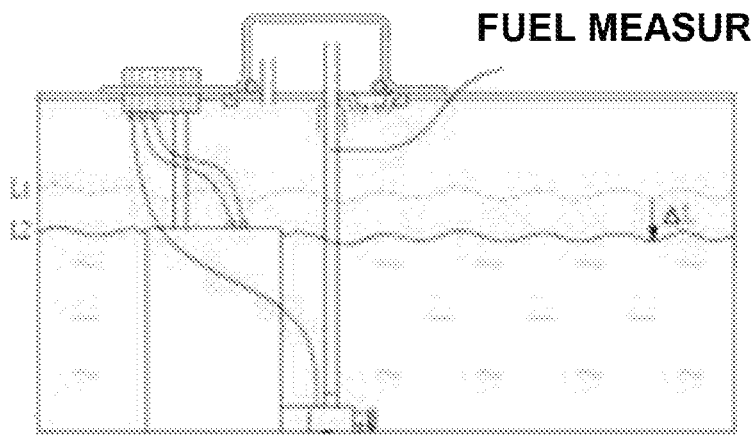
FIG. 1 is a view illustrating a fuel tank for a vehicle according to the related art.
Figure 2:
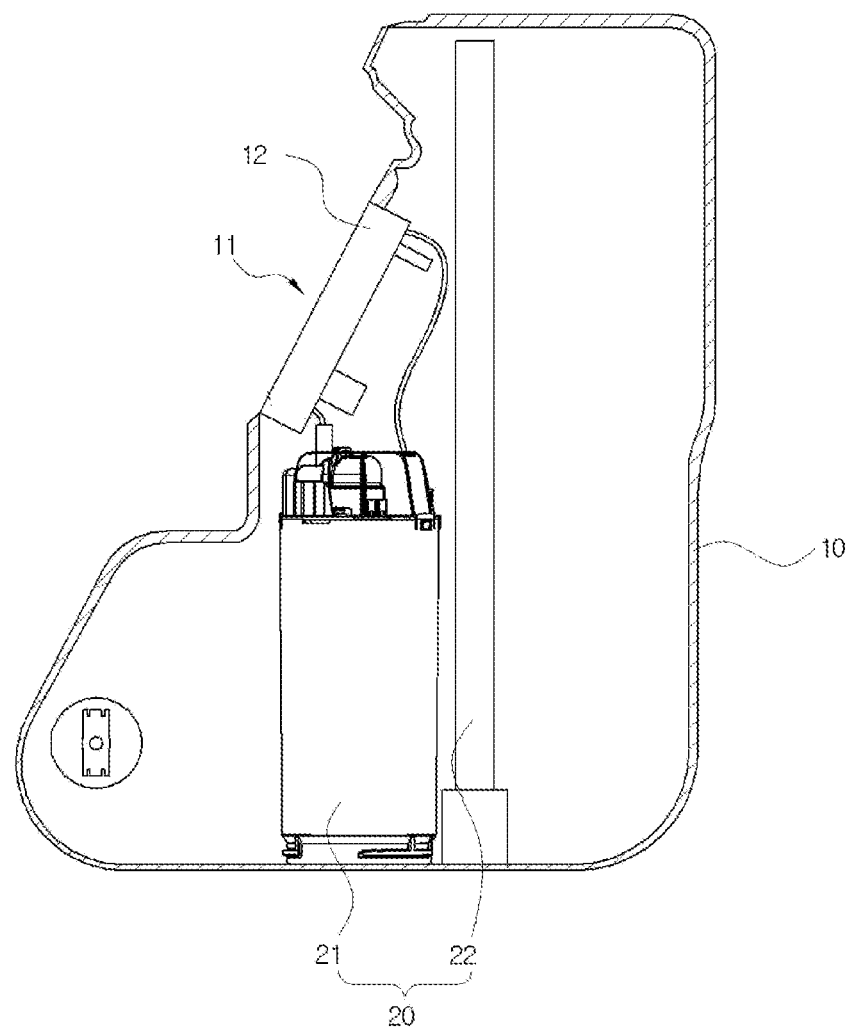
FIG. 2 is another view illustrating a fuel tank for a vehicle according to the related art.
Figure 3:
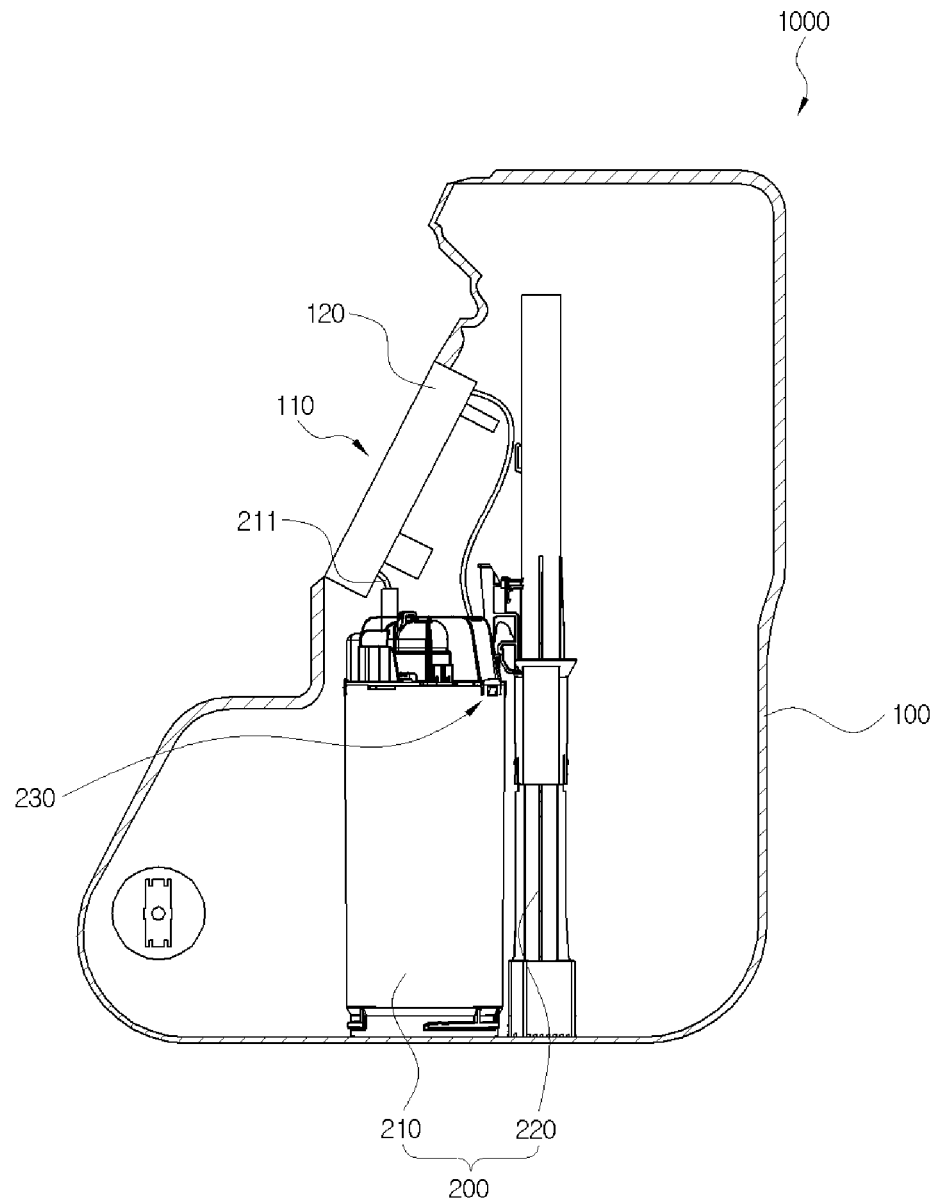
FIG. 3 is a view illustrating a fuel tank for a vehicle according to the present invention.
Figure 4A:
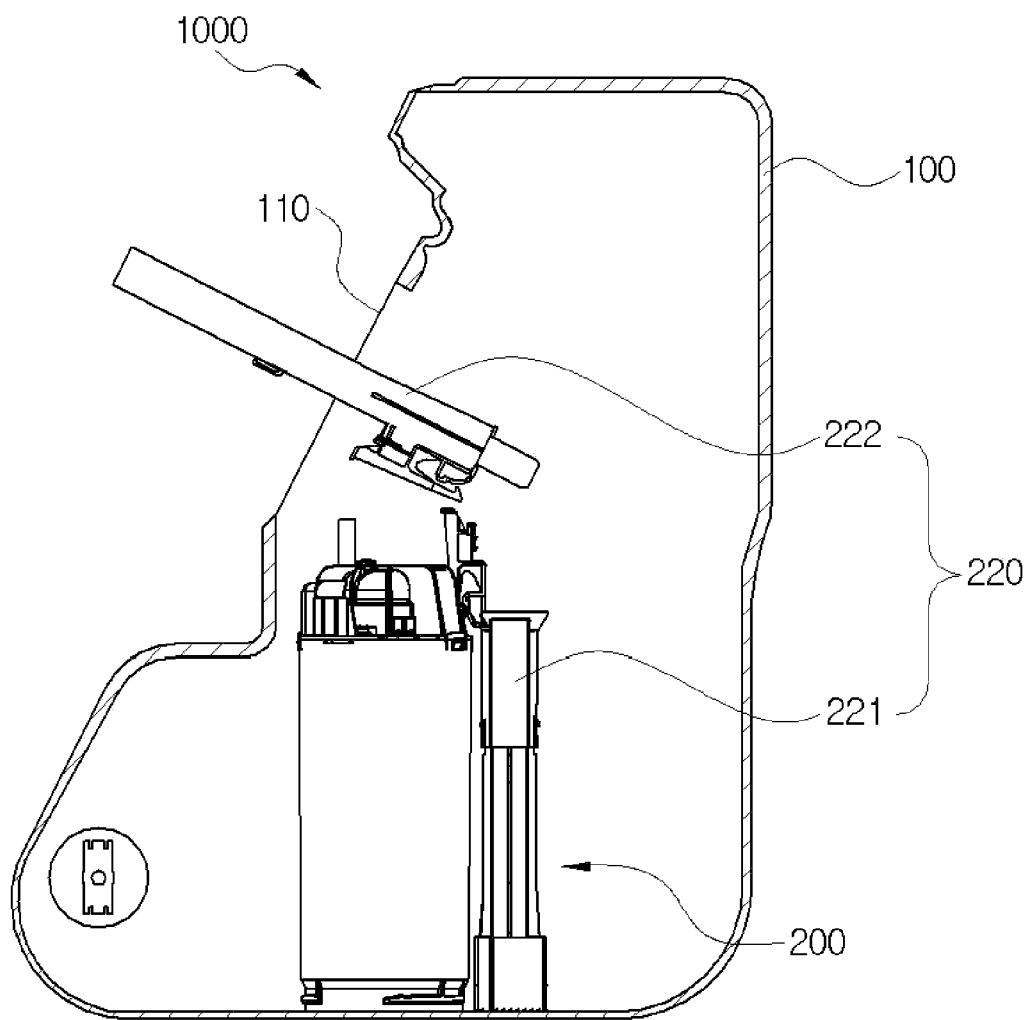
FIGS. 4A and 4B are other views illustrating a fuel tank for a vehicle according to the present invention.
Figure 4B:
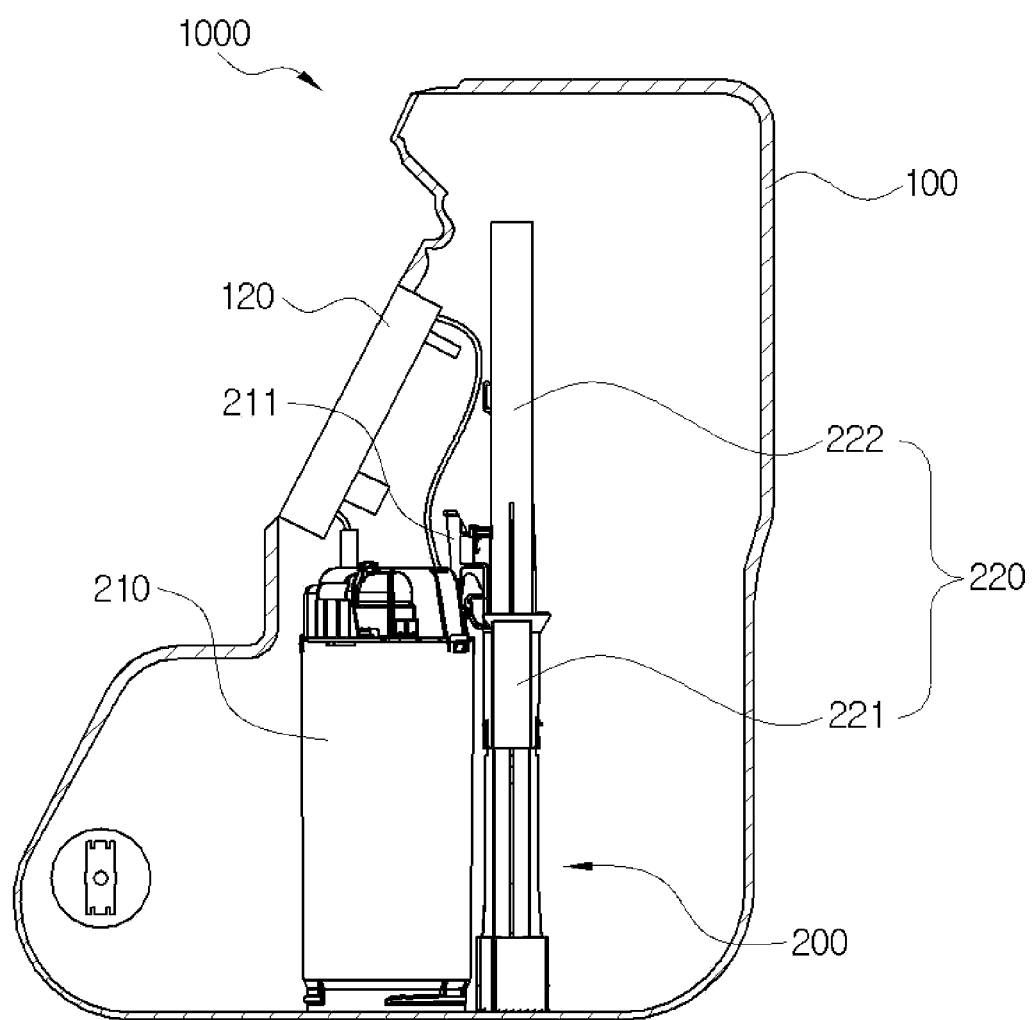
Figure 5:
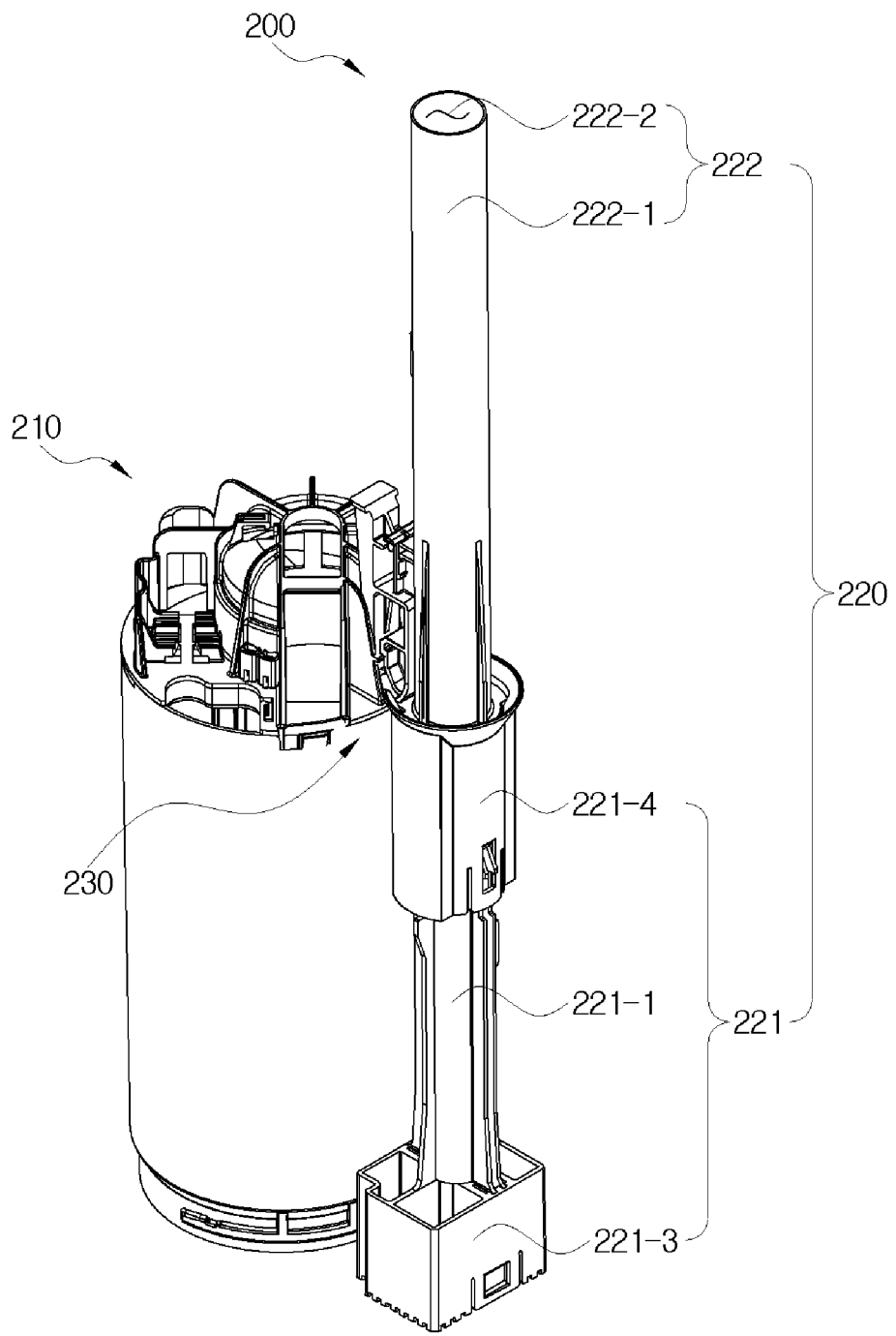
FIG. 5 is a view illustrating a fuel supplying unit of the fuel tank for a vehicle according to the present invention.
Figure 6:
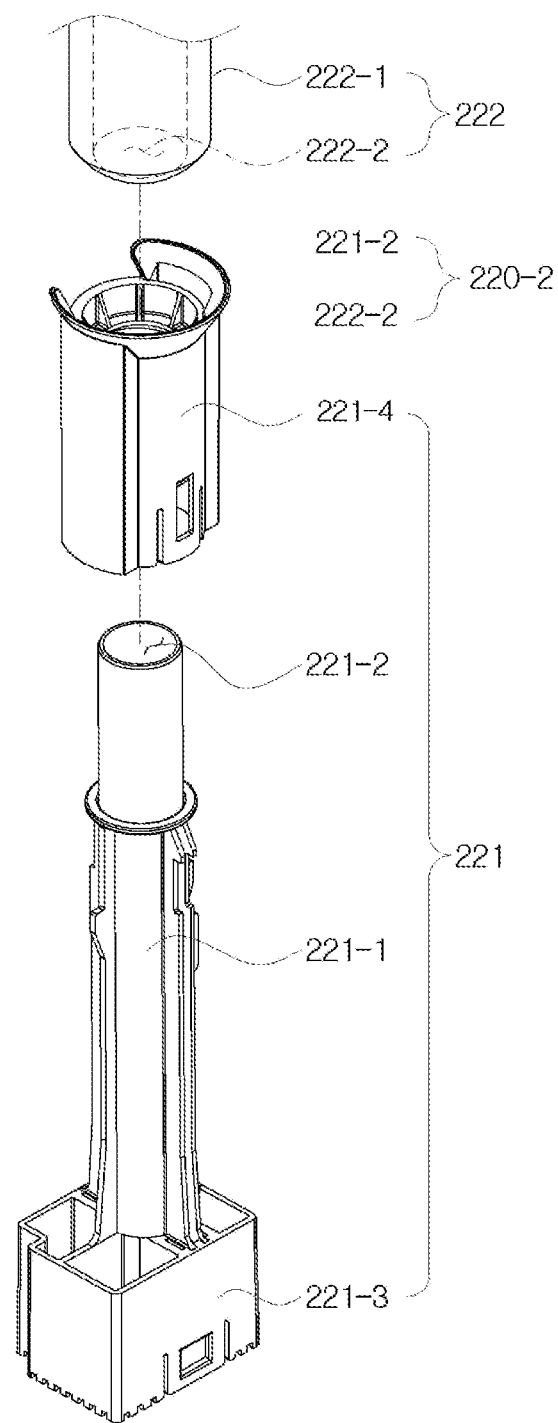
FIG. 6 is a view illustrating a first fuel measuring bar constituting the fuel supplying unit of the fuel tank for a vehicle according to the present invention.
Figure 7:
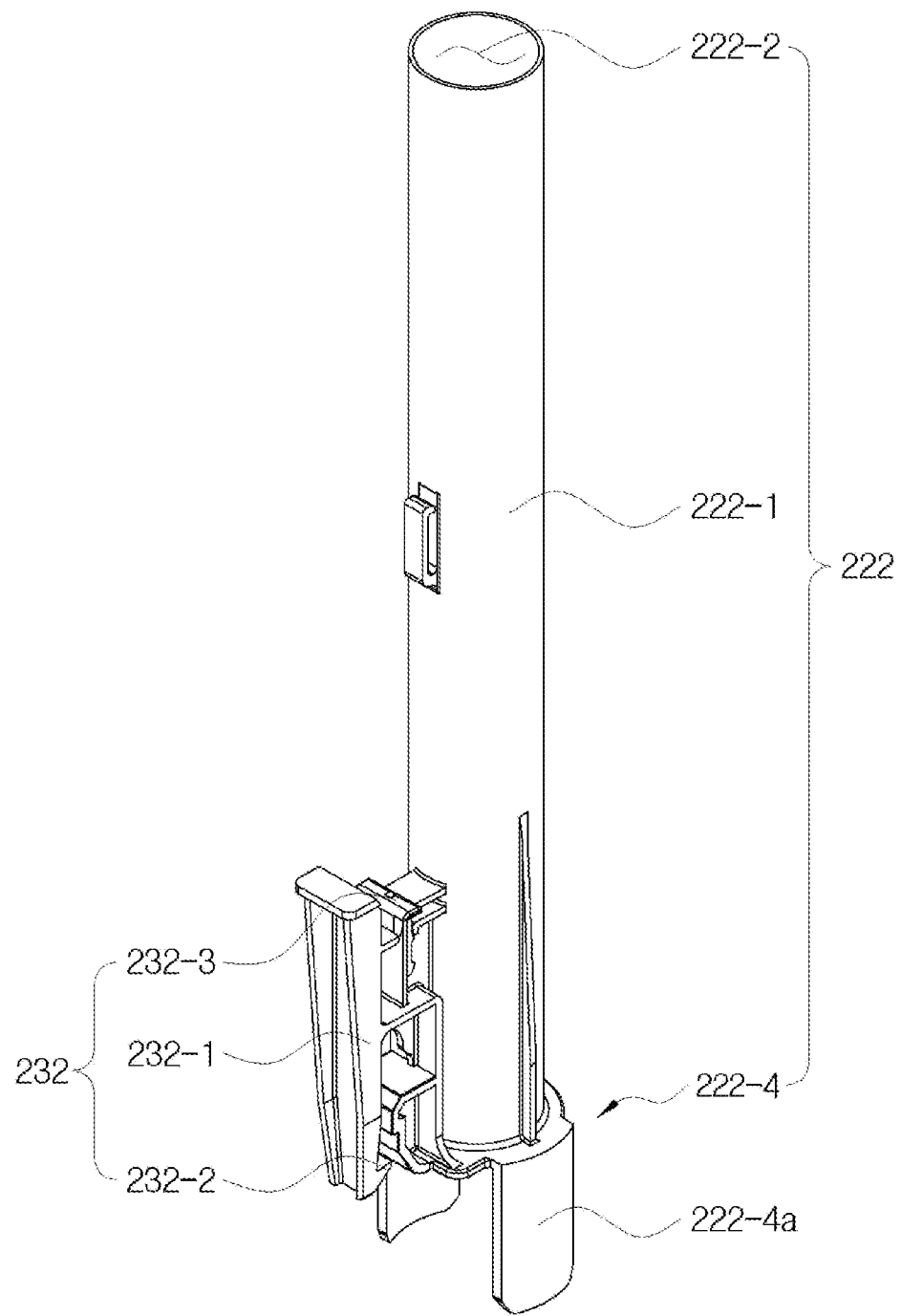
FIG. 7 is a view illustrating a second fuel measuring bar constituting the fuel supplying unit of the fuel tank for a vehicle according to the present invention.
Figure 8:
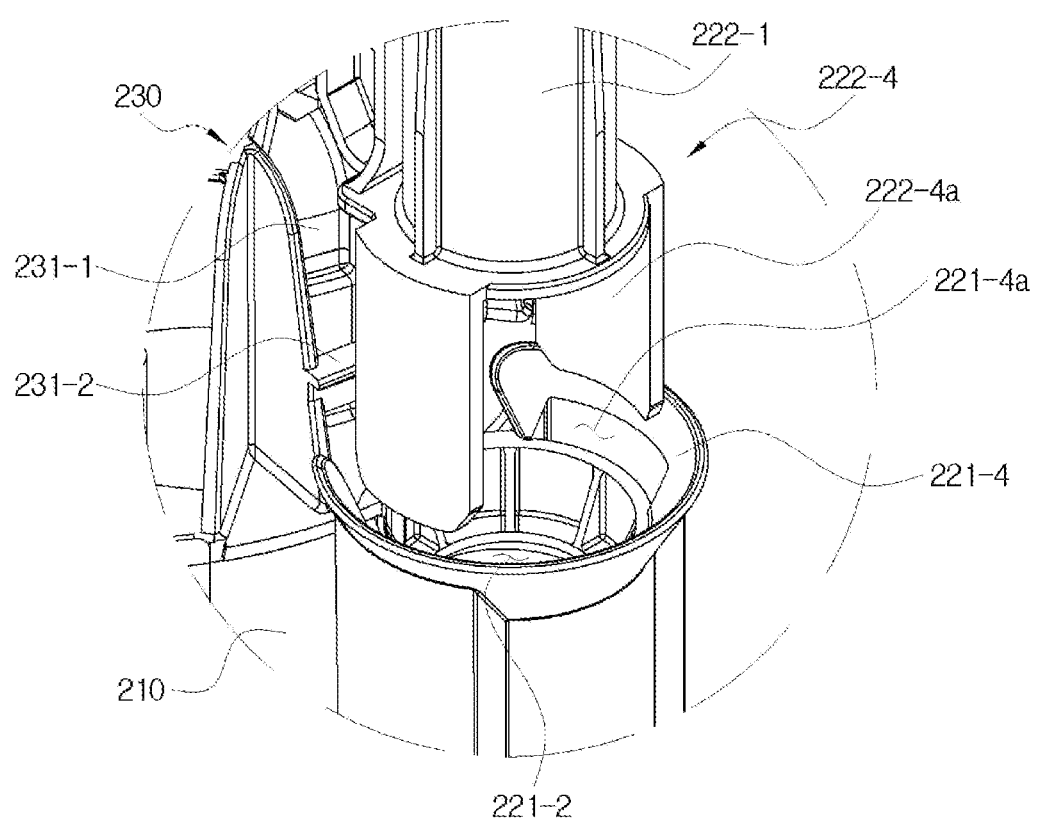
FIG. 8 is a view illustrating fixing of a fuel measuring bar constituting the fuel supplying unit of the fuel tank for a vehicle according to the present invention.
Figure 9A:
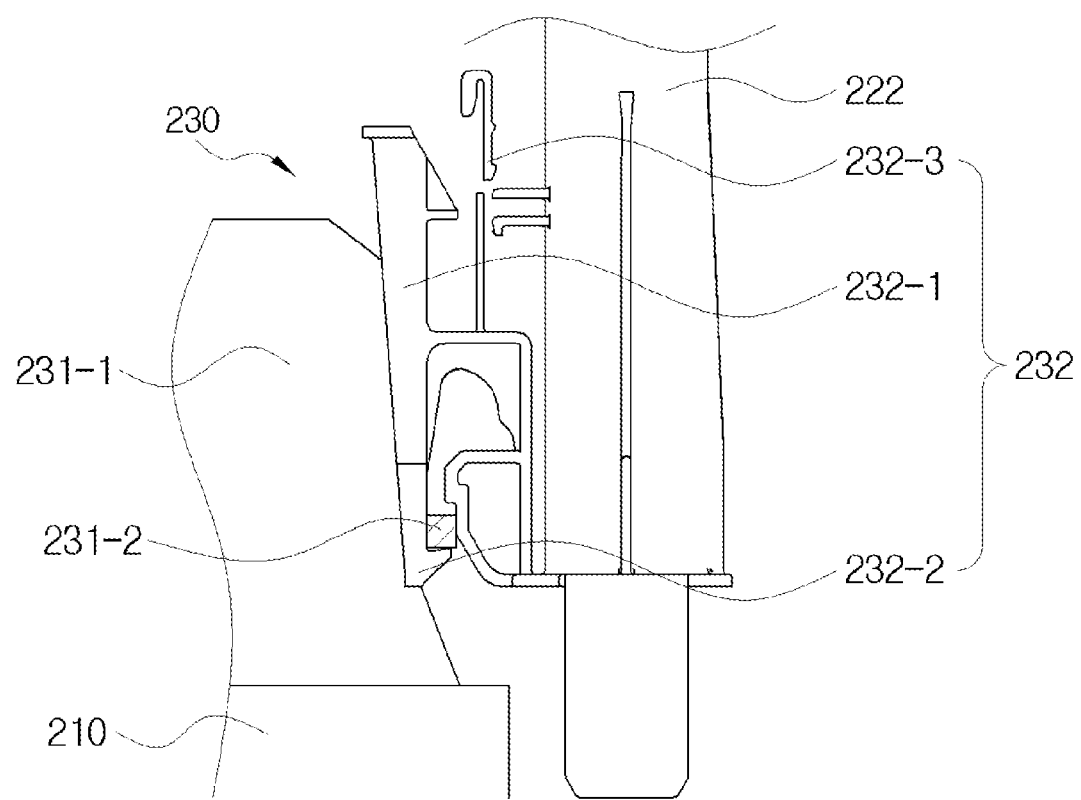
FIGS. 9A and 9B are views illustrating a fixing portion of the fuel tank for a vehicle according to the present invention.
Figure 9B:
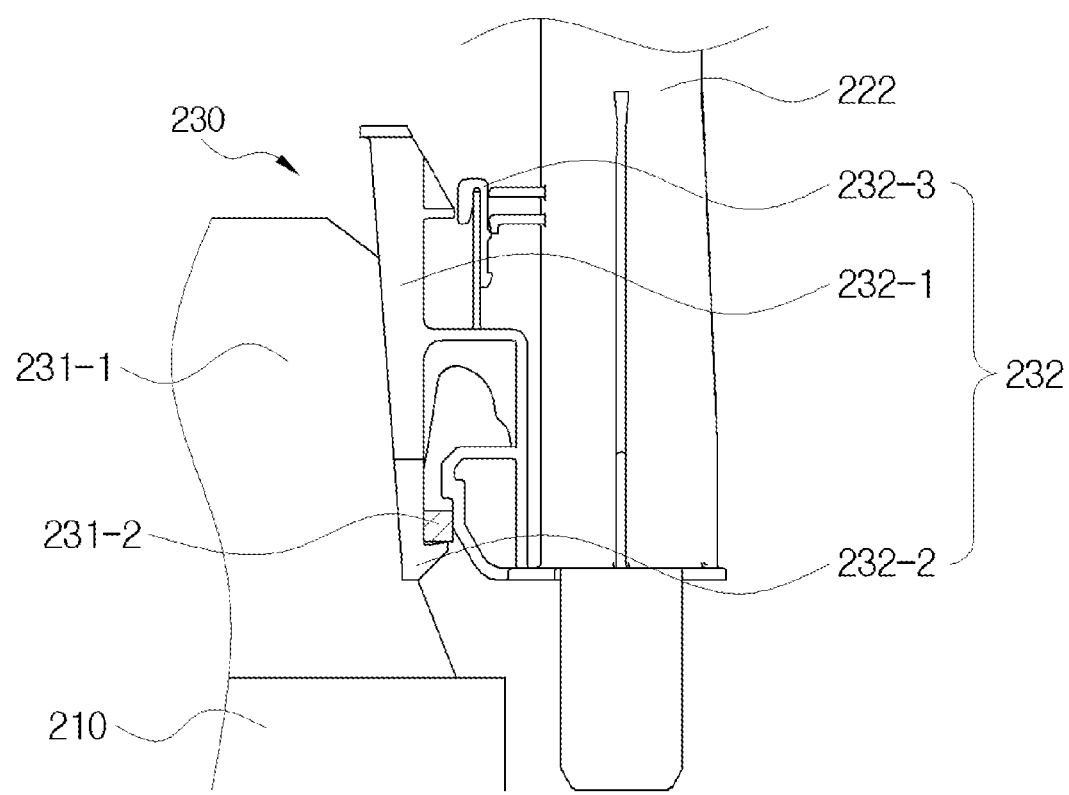

FIG. 3 is a view illustrating a fuel tank for a vehicle according to the present invention, FIGS. 4A and 4B are other views illustrating a fuel tank for a vehicle according to the present invention, FIG. 5 is a view illustrating a fuel supplying unit of the fuel tank for a vehicle according to the present invention, FIG. 6 is a view illustrating a first fuel measuring bar constituting the fuel supplying unit of the fuel tank for a vehicle according to the present invention, FIG. 7 is a view illustrating a second fuel measuring bar constituting the fuel supplying unit of the fuel tank for a vehicle according to the present invention, FIG. 8 is a view illustrating fixing of a fuel measuring bar constituting the fuel supplying unit of the fuel tank for a vehicle according to the present invention, and FIGS. 9A and 9B are views illustrating a fixing portion of the fuel tank for a vehicle according to the present invention.

The fuel tank 1000 for a vehicle according to the present invention is configured to mainly include a fuel storing body 100 in which a fuel for combustion of an engine is stored and a fuel supplying unit 200 supplying the fuel stored in the fuel storing body 100 to the engine, as illustrated in FIGS. 3 to 4B.

The fuel storing body 100 includes a fuel supplier (not illustrated) and stores the fuel supplied from the fuel supplier, and a shape of the fuel storing body 100 may be various depending on a size, a purpose, and the like, of the vehicle, and is thus not limited to that illustrated in the drawings.

In addition, the fuel storing body 100 may include a flange hole 110 formed therein so that the fuel supplying unit 200, or the like, may enter the fuel storing body 100 and exit from the fuel storing body 100, and the flange hole 110 of the fuel tank 1000 for a vehicle according to the present invention is formed in an upper portion of a side surface of the fuel storing body 100. However, the flange hole 110 is not limited thereto, but may also be formed in various positions.

The fuel supplying unit 200 is configured to mainly include a fuel pump 210 and a fuel measuring bar 220, and the fuel pump 210 may be provided in the fuel storing body 100 and supply the fuel to the engine through a fuel channel 211 connected to the engine.

The fuel measuring bar 220 is formed to measure a fuel amount stored in the fuel storing body 100 so as to allow the fuel pump 210 to supply the fuel by a selected fuel amount to the engine.

The fuel channel 211 of the fuel pump 210 may be fixed to a flange lid 120, or the like, and the flange lid 120 may include a pressure sensor (not illustrated), or the like, as well as the fuel channel 211, and be fixed to the flange hole 110 to close the fuel storing body 100, thereby making it possible to prevent the fuel to be leaked to the outside.

However, the fuel pump, the fuel channel, the flange lid, and the like, are the well-known technology, and a detailed description therefor will thus be omitted.

As illustrated in FIGS. 3 to 9B, the fuel measuring bar 220 may be formed in a vertical direction at one side of the fuel pump 210 in the fuel storing body 100, and may measure a fuel amount in the fuel storing body 100 using an ultrasonic sensor formed at a lower end thereof.

Here, an object of the fuel tank 1000 for a vehicle according to the present invention is to provide the fuel measuring bar 220 of which decoupling for assembling and replacement is easily conducted through the flange hole 110 formed in the upper portion of the side surface of the fuel storing body 100. To this end, the fuel measuring bar 220 includes a first fuel measuring bar 221 and a second fuel measuring bar 222, and may be formed by coupling the first fuel measuring bar 221 and the second fuel measuring bar 222 to each other.

That is, the fuel measuring bar 220 is formed to be separated into the first fuel measuring bar 221 and the second fuel measuring bar 222 which each enter the fuel storing body 100, and the first fuel measuring bar 221 and the second fuel measuring bar 222 entering the fuel storing body 100 are coupled to each other in the fuel storing body 100.

The first fuel measuring bar 221 and the second fuel measuring bar 222 constituting the fuel measuring bar 220 will be described in more detail. The first fuel measuring bar 221 includes a first fuel measuring bar body 221-1 including a first fuel measuring path 221-2 formed to be hollowed, and an ultrasonic sensor unit 221-3 disposed at a lower end of the first fuel measuring bar body 221-1 and including an ultrasonic sensor (not illustrated).

Here, the ultrasonic sensor unit 221-3 is formed to be fixed to a bottom surface of the fuel storing body 100, thereby making it possible to fix the first fuel measuring bar 221 to the bottom surface of the fuel storing body 100.

The second fuel measuring bar 222 includes a second fuel measuring bar body 222-1 having a lower end formed to be coupled to an upper end of the first fuel measuring bar body 221-1 and including a second fuel measuring path 222-2 hollowed so as to be in communication with the first fuel measuring path 221-2 and forming a fuel measuring path 220-2 by coupling to the first fuel measuring path 221-2.

That is, in the fuel measuring bar 220, the first fuel measuring bar 221 is fixed to the bottom surface of the fuel storing body 100, and the fuel measuring path 220-2 is formed by the second fuel measuring bar 222 coupled to an upper end of the first fuel measuring bar 221, such that a fuel amount of the fuel positioned in the fuel measuring path 220-2 may be measured using the ultrasonic sensor of the ultrasonic sensor unit 221-3.

As described above, the fuel measuring bar 220 is formed by coupling the first fuel measuring bar 221 and the second fuel measuring bar 222 to each other, and a coupling configuration therefor will be described in more detail with reference to the drawings.

The first fuel measuring bar 221 includes a fitting portion 221-4 formed at the upper end of the first fuel measuring bar body 221-1 and including fitting grooves 221-4a formed in an outer peripheral surface of the first fuel measuring path 221-2.

The second fuel measuring bar 222 includes a sliding portion 222-4 formed at the lower end of the second fuel measuring bar body 222-1 and including sliding protrusions 222-4a formed on an outer peripheral surface of the second fuel measuring path 222-2 so as to be fitted into the fitting grooves 221-4a.

That is, the sliding protrusions 222-4a of the sliding portion 222-4 of the second fuel measuring bar 222 are formed to protrude from the second fuel measuring bar body 222-1 in a downward direction to be thus fitted into the fitting grooves 221-4a of the fitting portion 221-4.

Here, cross sections of the fitting grooves 221-4a of the fitting portion 221-4 and the sliding protrusions 222-4a fitted into the fitting grooves 221-4a have a circular shape, such that the sliding protrusions 222-4a may be fitted into the fitting grooves 221-4a.

However, it is preferable that two or more sliding protrusions 222-4a are formed at both sides of the sliding portion 222-4 in a horizontal direction so as to protrude in the downward direction, as illustrated in the drawings, in consideration of easiness of manufacturing and a manufacturing cost, and the fitting grooves 221-4a also have a shape corresponding to that of the sliding protrusions 222-4a.

This may make a manufacturing process easy, and prevent the sliding protrusions 222-4a from being not firmly fitted into the fitting grooves 221-4a by rotating the sliding protrusions 222-4a in the fitting grooves 221-4a.

As described above, the first fuel measuring bar 221 and the second fuel measuring bar 222 are coupled to each other to form the fuel measuring bar 220, and need to be easily decoupled from each other for the purpose of replacement after they are coupled and assembled to each other.

Therefore, it is preferable that the fuel measuring bar 220 is formed so that the first fuel measuring bar 221 and the second fuel measuring bar 222 may be coupled to each other only by fitting the sliding protrusions 222-4a of the second fuel measuring bar 222 into the fitting grooves 221-4a of the first fuel measuring bar 221, as described above.

However, the first fuel measuring bar 221 and the second fuel measuring bar 222 are easily coupled to and decoupled from each other, but it is difficult to maintain verticality of the first fuel measuring bar 221 and the second fuel measuring bar 222 in the vertical direction due to the fuel in the fuel storing body 100, such that it is difficult to accurately measure a fuel amount, and the first fuel measuring bar 221 and the second fuel measuring bar 222 are decoupled from each other due to external impact, or the like, such that it is difficult to appropriately perform a role such as measurement of the fuel amount, or the like.

Particularly, the first fuel measuring bar 221 is fixed to the fuel storing body 100, but the second fuel measuring bar 222 is coupled to the first fuel measuring bar 221 in only a level in which it is fitted into the first fuel measuring bar 221, such that there is a risk that the second fuel measuring bar 222 will be decoupled or separated.

The fuel supplying unit 200 of the fuel tank 100 for a vehicle according to the present invention may further include a separate fixing portion 230 fixing the fuel measuring bar 220 to the fuel pump 210, in consideration of the problem described above.

The fixing portion 230 includes a fuel pump fixing portion 231 formed at one side of the fuel pump 210 facing the fuel measuring bar 220 and a fuel measuring bar fixing portion 232 formed at one side of the second fuel measuring bar 222 facing the fuel pump fixing portion 231 so as to be fixed to the fuel pump fixing portion 231.

That is, the fuel supplying unit 200 may fix the second fuel measuring bar 222 to the fuel pump 210 through the fixing portion 230 including the fuel pump fixing portion 231 formed at the fuel pump 210 and the fuel measuring bar fixing portion 232 formed at the second fuel measuring bar 222, and the fixing portion 230 may prevent movement and separation of the second fuel measuring bar 222.

In other words, the ultrasonic sensor unit 221-3 formed at a lower end of the first fuel measuring bar 221 is fixed to the bottom surface of the fuel storing body 100, and the second fuel measuring bar 222 is fixed to the fuel pump 210 through the fixing portion 230 formed at the fuel pump 210 and the second fuel measuring bar 222 so as to maintain verticality in the vertical direction and prevent the movement and the separation of the second fuel measuring bar 222 while being fitted into and coupled to the first fuel measuring bar 221.

The fixing portion 230 described above will be described in more detail. The fuel pump fixing portion 231 of the fixing portion 230 includes a guide path 231-1 formed in the vertical direction and a fixing jaw 231-2 formed at a lower side of the guide path 231-1 to protrude toward the fuel measuring bar 220.

The fuel measuring bar fixing portion 232 may be formed in a tongs shape including a tongs body 232-1 having a shape corresponding to that of the guide path 231-1 to be fitted into the guide path 231-1 and a fixing protrusion 232-2 formed at a lower distal end of the tongs body 231-1 and formed to be fixed to the fixing jaw 231-2.

That is, the fixing jaw 231-2 of the fuel pump fixing portion 231 may be formed to protrude toward the fuel measuring bar 220 and be formed to protrude in a state in which it is spaced apart from the guide path 231-1 to include a hollow through which the tongs body 232-1 may pass.

In this case, the tongs body 232-1 of the fuel measuring bar fixing portion 232 is fitted into the guide path 231-1 to move in the downward direction, a lower end of the tongs body 232-1 having a tongs shape is rotatably formed, and the fixing protrusion 232-2 is engaged with and fixed to the fixing jaw 231-2 by rotation, thereby making it possible to fix the second fuel measuring bar 222 to the fuel pump 210.

As described above, the fuel supplying unit 200 includes the fixing portion 230 formed in a tongs shape, thereby making it possible to easily fix the second fuel measuring bar 222 to the fuel pump 210 without separate fixing.

In this case, shaking or separation of the second fuel measuring bar 222 may be prevented to enable accurate measurement of the fuel in the fuel storing body 100 and reduce a manufacturing time required for assembling the fuel measuring bar 220.

In addition, when the second fuel measuring bar 222 is decoupled from the fuel pump 210 in order to replace the fuel measuring bar 220, the second fuel measuring bar 222 may be decoupled from the fuel pump by a simple decoupling operation of the fixing portion 230 formed in the tongs shape, and replacement is thus also easily performed.

In addition, the fuel measuring bar fixing portion 232 of the fixing portion 230 may further include a locking clip 232-3 formed to prevent the fuel measuring bar fixing portion 232 from being decoupled and separated from the fuel pump fixing portion 231 by rotation (in the case in which the tongs body 232-1 is not firmly fixed) of the tongs body 232-1 having the tongs shape after it is fixed to the fuel pump fixing portion 231.

The locking clip 232-3 is formed to be fitted and fixed between two portions of the tongs body 232-1 formed in the tongs shape to prevent rotation of the tongs bodies 232-1, thereby making it possible to prevent the separation of the fuel pump fixing portion 231 due to the tongs body 232-1.

In addition, it is preferable that the locking clip 232-3 is made of an elastic material, and it is preferable that the locking clip 232-3 may be easily fitted between the two portions of the tongs body 232-1 and prevent movement of the tongs body 232-1 by elasticity after it is fitted between the two portions of the tongs body 232-1.

As described above, the fixing portion 230 may fix the second fuel measuring bar 222 to the fuel pump 210 to prevent the decoupling and the separation of the second fuel measuring bar 222.

However, a configuration and a shape of the fixing portion 230 formed in the tongs shape described above are only an example, and the fixing portion 230 is not limited thereto, but may have various configurations and shapes as long as it may easily fix the second fuel measuring bar 222 to the fuel pump 210 or may easily decouple the second fuel measuring bar 222 from the fuel pump 210.

<First Exemplary Embodiment of Fuel Measuring Bar>

Figure 10:
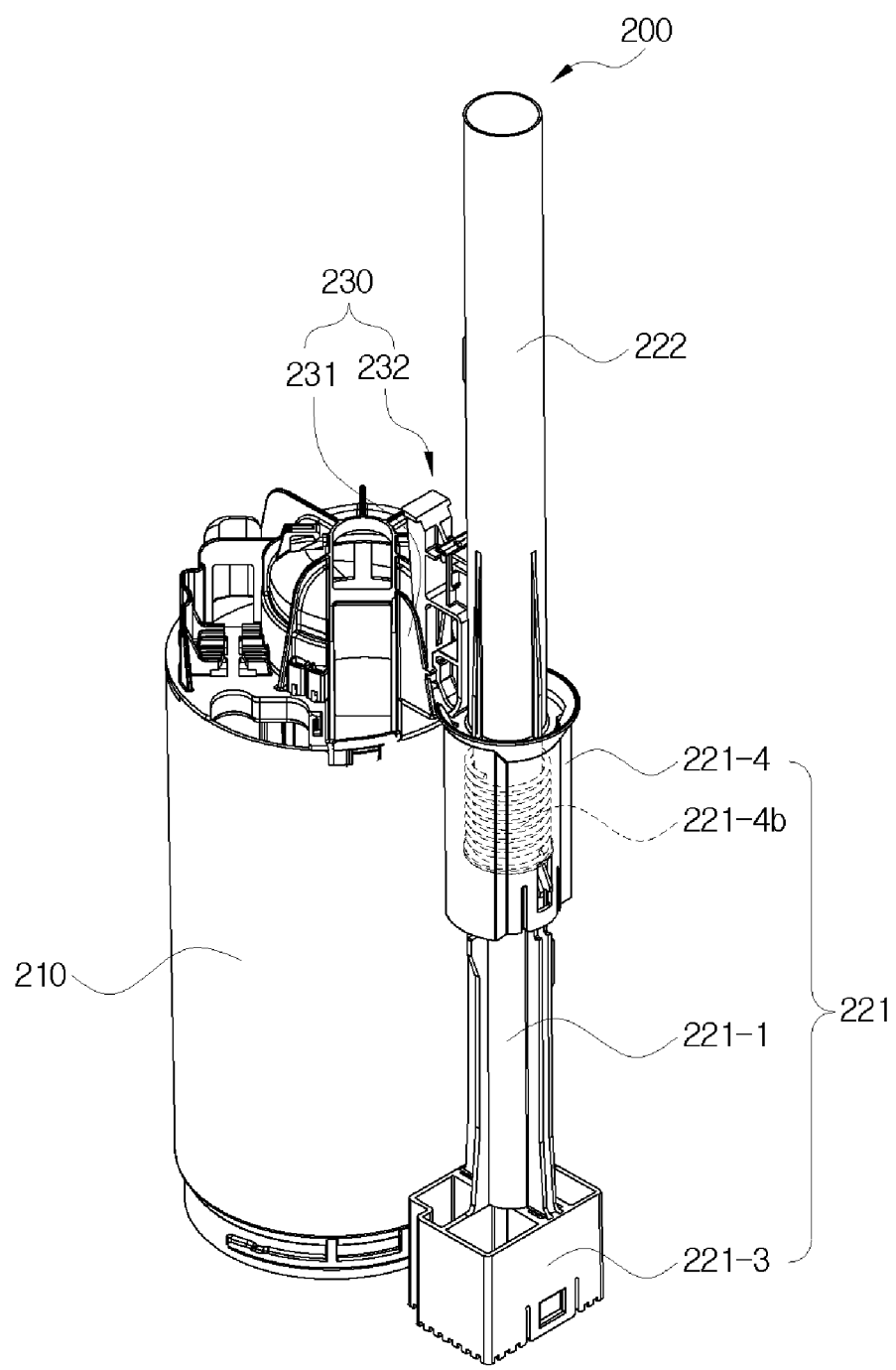
FIG. 10 is a view illustrating a fuel measuring bar constituting a fuel supplying unit of a fuel tank for a vehicle according to a first exemplary embodiment of the present invention.

FIG. 10 is a view illustrating a fuel measuring bar constituting a fuel supplying unit of a fuel tank for a vehicle according to a first exemplary embodiment of the present invention.

As illustrated in FIG. 10, the fitting portion 221-4 of the first fuel measuring bar 221 includes an elastic portion 221-4b formed on a lower surface of the fitting groove 221-4a and made of an elastic material.

The elastic portion 221-4b may be formed of a spring, or the like, made of an elastic material, the second fuel measuring bar 222 is fitted into and coupled to the fitting groove 221-4a and is fixed to the fuel pump 210, and at the same time, the second fuel measuring bar 222 applies force to the elastic portion 221-4b. Therefore, the elastic portion 221-4b applies force to the first fuel measuring bar 221 in the downward direction to firmly fix the first fuel measuring bar 221 to the fuel storing body 100.

In more detail, the first fuel measuring bar 221 may be fixed to the fuel storing body 100 by a fixing device such as a bracket, or the like, for the purpose of the future easy replacement work, and may be floated by a predetermined distance in an upward direction by the fuel stored in the fuel storing body 100.

It makes accurate measurement of the fuel amount by the ultrasonic sensor unit 221-3 difficult, and makes maintenance of the verticality of the first fuel measuring bar 221 in the vertical direction difficult.

Therefore, the elastic portion 221-4b applies the force to the first fuel measuring bar 221 in the downward direction, thereby making it possible to prevent the first fuel measuring bar 221 from being floated by the fuel.

<Second Exemplary Embodiment of Fuel Measuring Bar>

Figure 11:
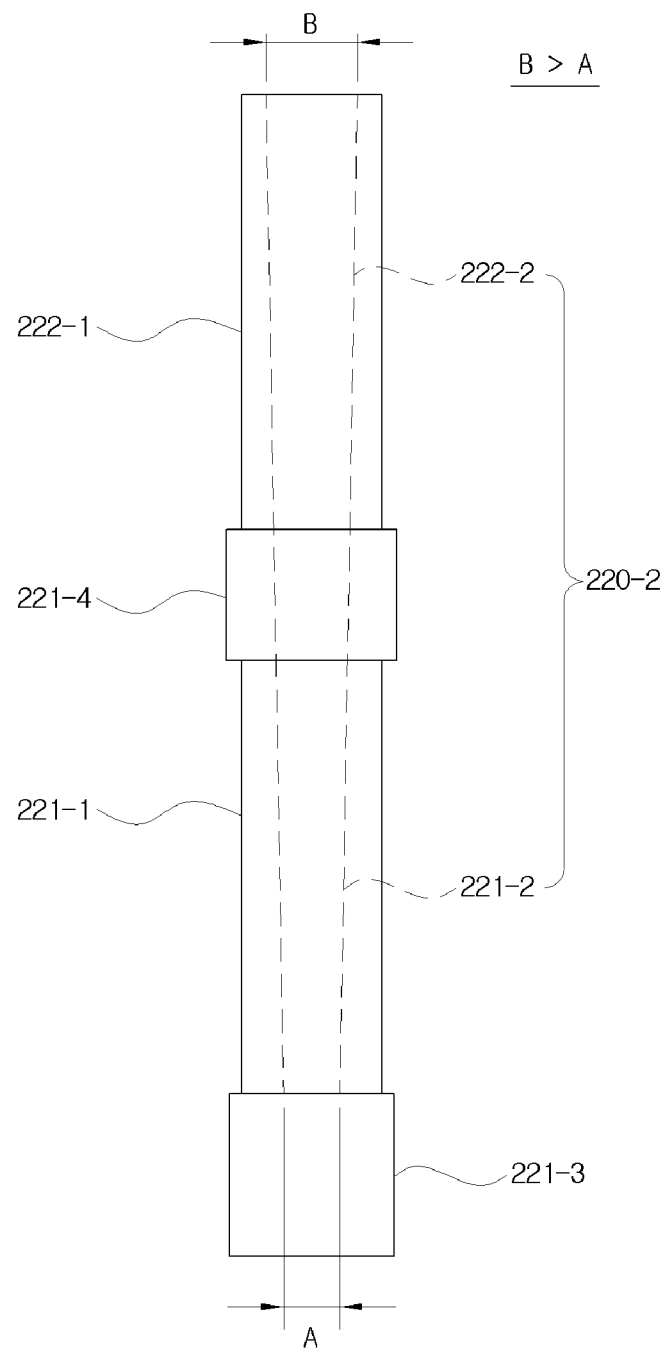
FIG. 11 is a view illustrating a fuel measuring bar constituting a fuel supplying unit of a fuel tank for a vehicle according to a second exemplary embodiment of the present invention.

FIG. 11 is a view illustrating a fuel measuring bar constituting a fuel supplying unit of a fuel tank for a vehicle according to a second exemplary embodiment of the present invention.

As illustrated in FIG. 11, the fuel measuring path 220-2 formed by coupling the first fuel measuring path 221-2 of the first fuel measuring bar 221 and the second fuel measuring path 222-2 of the second fuel measuring bar 222 may be formed to have a predetermined angle so that a diameter thereof in the horizontal direction becomes wide toward the upward direction.

That is, the ultrasonic sensor of the ultrasonic sensor unit 221-3 measures the fuel amount using an ultrasonic wave, and the ultrasonic wave linearly moves while being extended so that a diameter thereof in the horizontal direction becomes large.

In other words, when the fuel measuring path 220-2 through which the ultrasonic wave generated from the ultrasonic sensor moves is formed to have the same diameter, the ultrasonic wave linearly moves while being extended is reflected by a wall of the fuel measuring path 220-2, such that the fuel amount may not be accurately measured.

Therefore, the fuel measuring path 220-2 may be formed to have a diameter that is the same as or greater than a moving radius of the ultrasonic wave, and as described above, the fuel measuring path 220-2 is formed to have the predetermined angle so that the diameter thereof becomes wide toward the upward direction, thereby making it possible to prevent reflection of the ultrasonic wave.

As described above, it is preferable that the predetermined angle of the fuel measuring path 220-2 is the same as or slightly greater than a direction in which the ultrasonic wave moves while being diffused.

Figure 12:
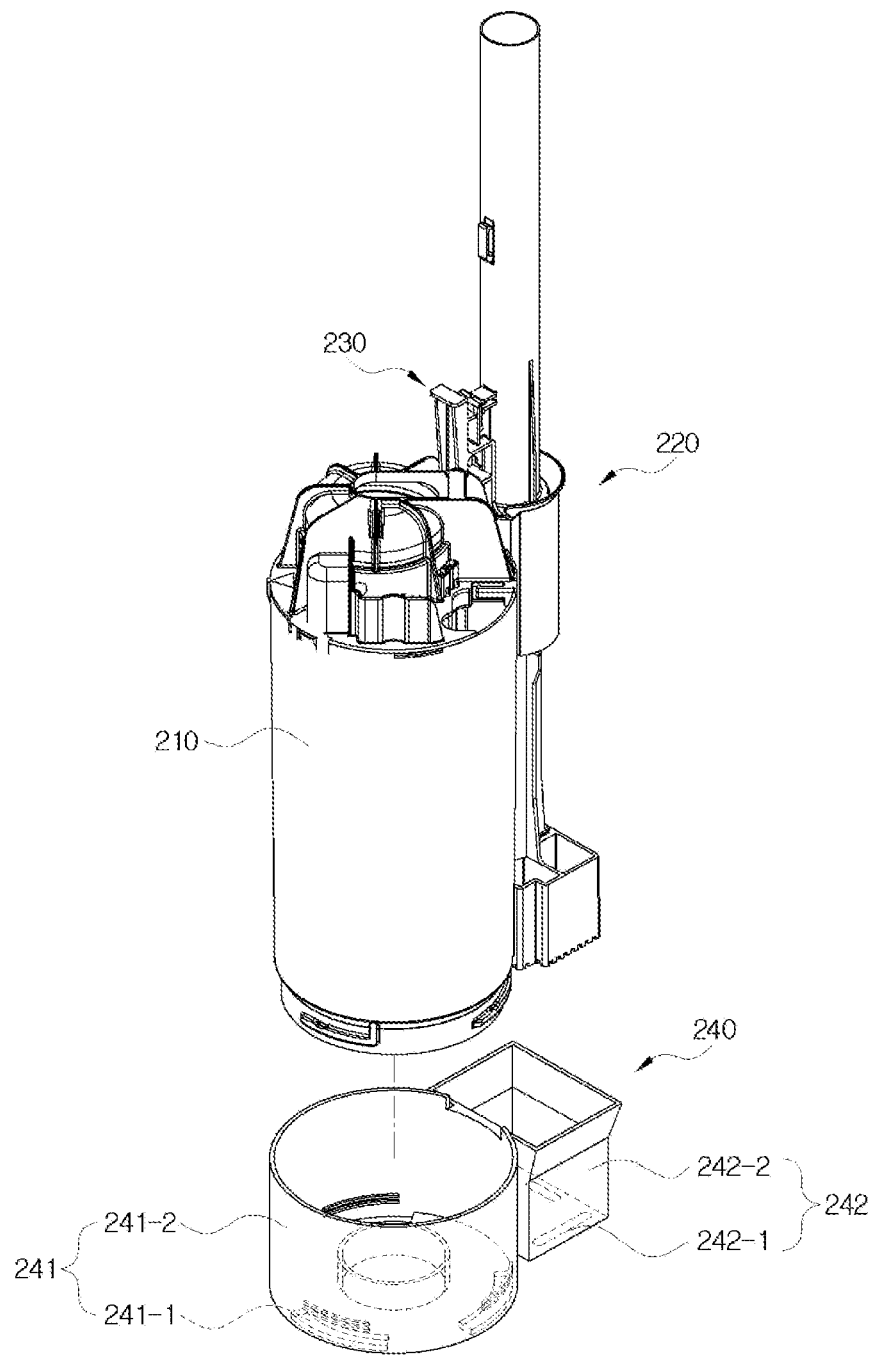
FIG. 12 is a view illustrating a bracket portion constituting the fuel supplying unit of the fuel tank for a vehicle according to the present invention.

FIG. 12 is a view illustrating a bracket portion constituting the fuel supplying unit of the fuel tank for a vehicle according to the present invention.

As illustrated in FIG. 12, the fuel supply unit 200 may further include a bracket portion 240 including a first bracket portion 241 and a second bracket portion 242, the first bracket portion 241 including a first bracket 241-1 formed on the bottom surface of the fuel storing body 100 so that a lower end of the fuel pump 210 may be fixed thereto, and the second bracket portion 242 including a second bracket 242-1 formed on the bottom surface of the fuel storing body 100 so that a lower end of the ultrasonic sensor unit 221-3 may be fixed thereto.

The bracket portion 240 is formed to be fixed to the bottom surface of the fuel storing body 100, may easily fix the fuel pump 210 and the fuel measuring bar 220 using the first bracket 241-1 and the second bracket 242-1, and may facilitate decoupling depending on replacement by the fixing of the brackets.

Here, configurations and shapes of the first bracket 241-1 and the second bracket 242-1 are not limited to those illustrated in the drawing, but may be variously modified so that the first bracket 241-1 and the second bracket 242-1 may easily fix and decouple the fuel pump 210 and the fuel measuring bar 220.

In addition, the first bracket portion 241 and the second bracket portion 242 constituting the bracket portion 240 may include a first bracket auxiliary portion 241-2 and a second bracket auxiliary portion 242-2 formed in the upward direction, respectively.

Since the first bracket auxiliary portion 241-2 and the second bracket auxiliary portion 242-2 may serve as guide paths for fixing the fuel pump 210 and the fuel measuring bar 220 to the bracket portion 240, the fuel pump 210 and the fuel measuring bar 220 obliquely entering the fuel storing body 100 at a predetermined angle through the flange hole 110 may be accurately and easily fixed to the bracket portion 240.

In addition, the first bracket auxiliary portion 241-2 and the second bracket auxiliary portion 242-2 fix vertical positions of the fuel pump 210 and the fuel measuring bar 220 fixed to the first bracket 241-1 and the second bracket 242-1, respectively, thereby enabling a pumping operation of the fuel pump 210 and accurate measuring of the fuel amount by the fuel measuring bar 220, respectively.

It is preferable that the second bracket auxiliary portion 242-2 is formed in a penetration form so that the fuel may move to the fuel measuring path 220-2 in the fuel measuring bar 220.

In addition, it is preferable that the bracket portion 240 described above is formed of a plastic material. However, the bracket portion 240 is not limited thereto, but may be formed of various materials.

As described above, the ultrasonic sensor unit 221-3 of the fuel tank 1000 for a vehicle according to the present invention measures the fuel amount using the ultrasonic sensor, and a method for optimizing driving of an ultrasonic sensor capable of accurately measuring a liquid level in a fuel tank for a vehicle in a state in which a blind zone is minimized by controlling a driving state of the ultrasonic sensor in measuring the liquid level of the fuel tank for a vehicle using the ultrasonic sensor of the ultrasonic sensor unit 221-3 will be additionally described.

<First Exemplary Embodiment of Method for Optimizing Driving of Ultrasonic Sensor>

Figure 13:
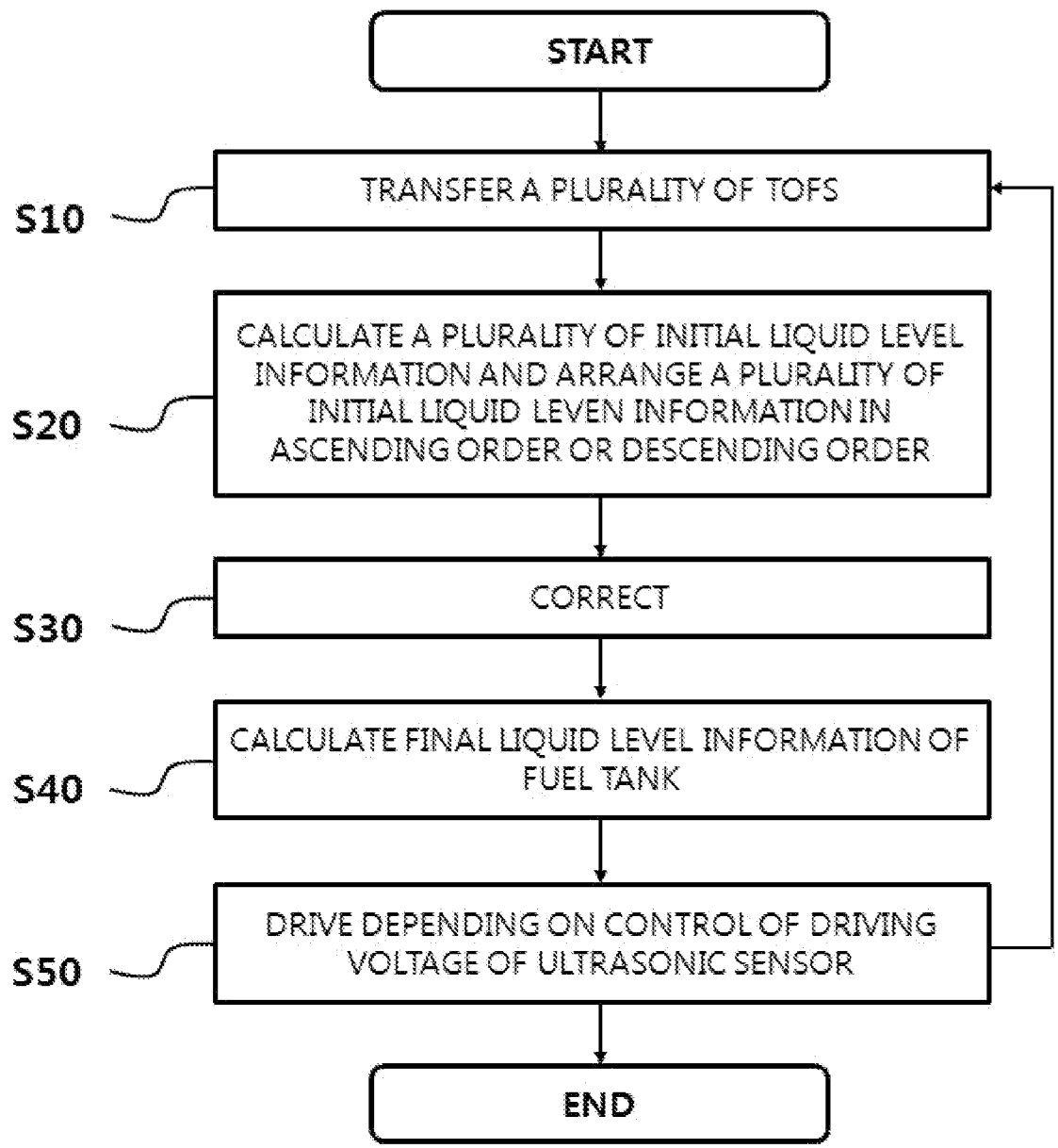
FIG. 13 is a flow chart illustrating a method for optimizing driving of an ultrasonic sensor according to an exemplary embodiment of the present invention.

The method for optimizing driving of an ultrasonic sensor may be configured to include a measuring step (S10), an arranging step (S20), a correcting step (S30), a liquid level measuring step (S40), and an ultrasonic driving control step (S50), as illustrated in FIG. 13.

Here, the liquid level described above indicates a level of the fuel stored in an inner portion (the fuel measuring path of the fuel measuring bar) of the fuel storing body of the fuel tank for a vehicle.

In the measuring step (S10), a central processing unit (not illustrated) may receive a plurality of TOFs transferred from the ultrasonic sensor unit 221-3.

Here, the plurality of TOFs are TOF references transferred from a reference sensor of the ultrasonic sensor unit 221-3 and TOF surface levels transferred from a measuring sensor of the ultrasonic sensor unit 221-3 by a preset number of times for a preset time.

In the arranging step (S20), the central processing unit may calculate a plurality of initial liquid level information using the plurality of TOFs transferred in the measuring step (S10), and arrange the plurality of initial liquid level information in an ascending order or a descending order.

The initial liquid level information may be calculated by substituting the time-of-flight (TOF) reference transferred from the reference sensor and the TOF surface level transferred from the measuring sensor into the following Equation.

liquid level information=(reference distance)*(TOF reference/TOF surface level)

Here, the reference distance means a distance from the oscillating unit of the reference sensor to the reflecting unit that is formed in advance, and the liquid level information of the fuel tank may be calculated by obtaining the TOF reference for the reference distance that is already recognized, that is, the time required for the ultrasonic time to be reflected by and return from the reflecting unit, using the reference sensor to calculate a speed of the ultrasonic signal for the fuel (liquid) in the fuel tank and obtaining the TOF surface level, that is, the time required for the ultrasonic signal to be reflected by and return from the surface (the fuel surface) using the measuring sensor.

In the correcting step (S30), the central processing unit excludes initial liquid level information corresponding to a preset reference value or less or initial liquid level information corresponding to 0 among the plurality of initial liquid level information that is arranged in the ascending order or the descending order in the arranging step (S20).

In the liquid level measuring step (S40), the central processing unit calculates final liquid level information of the fuel tank using a plurality of initial liquid level information remaining after the initial liquid level information corresponding to the preset reference value or less or the initial liquid level information corresponding to 0 is excluded among the plurality of initial liquid level information in the correcting step (S30).

In detail, in the case in which the number of initial liquid level information remaining after the initial liquid level information corresponding to the preset reference value or less or the initial liquid level information corresponding to 0 is excluded among the plurality of initial liquid level information is an odd number, the central processing unit calculates the final liquid level information of the fuel tank as a middle value, and in the case in which the number of initial liquid level information remaining after the initial liquid level information corresponding to the preset reference value or less or the initial liquid level information corresponding to 0 is excluded among the plurality of initial liquid level information is an even number, the central processing unit calculates the final liquid level information of the fuel tank as an average value of the middle two TOFs.

For example, in the case in which the number of initial liquid level information that remains is five, the central processing unit calculates an initial liquid level information value arranged at a third position as the final liquid level information, and in the case in which the number of initial liquid level information that remains is four, the central processing unit calculates the final liquid level information as an average value of initial liquid level information values arranged at second and third positions.

In addition, it is preferable that the method for optimizing driving of an ultrasonic sensor according to an exemplary embodiment of the present invention further includes a displaying step performed after the liquid level measuring step (S40) is performed.

In the displaying step, the calculated liquid level information is transferred to a display unit capable of outputting the liquid level information to allow a driver of the vehicle to easily confirm (recognize) a fuel amount currently remaining in the fuel tank.

In the ultrasonic driving control step (S50), the central processing unit may control a driving voltage of the ultrasonic sensor unit using the final liquid level information calculated in the liquid level measuring step (S40).

In detail, it is preferable that the central processing unit controls the driving voltage to be a minimum value of an allowable driving voltage of the ultrasonic sensor unit in the case in which the calculated liquid level information of the fuel tank is a preset minimum fuel amount value or less and controls the driving voltage to be a maximum value of the allowable driving voltage of the ultrasonic sensor unit in the case in which the calculated liquid level information of the fuel tank exceeds the preset minimum fuel amount value.

In addition, the central processing unit may forcibly control a driving pulse width of the ultrasonic sensor unit while controlling the driving voltage to be the minimum value of the allowable driving voltage of the ultrasonic sensor unit in the case in which the calculated liquid level information of the fuel tank exceeds the preset minimum fuel amount value.

Here, the preset minimum fuel amount value is a value obtained by adding up a height of a general ultrasonic sensor itself and a height of a time in which a ringing time of the ultrasonic sensor is transferred, and is changed depending on a specification of the ultrasonic sensor, and a forcible control degree of the driving pulse width is changed depending on the specification of the ultrasonic sensor.

In addition, it is preferable that the central processing unit primarily forcibly controls the number of pulses of the ultrasonic sensor unit in the case in which the calculated liquid level information of the fuel tank exceeds the preset minimum fuel amount value and is a preset maximum fuel amount value or less, and secondarily forcibly controls the number of pulses of the ultrasonic sensor unit in the case in which the calculated liquid level information of the fuel tank exceeds the preset maximum fuel amount value.

Here, it is preferable that the preset maximum fuel amount value is differently set depending on a specification of the fuel tank, and the number of times of the forcible control of the number of pulses is also changed depending on the specification of the ultrasonic sensor.

In the method for optimizing driving of an ultrasonic sensor according to an exemplary embodiment of the present invention, after the ultrasonic driving control step (S50) is performed, the measuring step (S10), the arranging step (S20), the correcting step (S30), the liquid level measuring step (S40), and the ultrasonic driving control step (S50) may be repeatedly performed using the driving voltage of the ultrasonic sensor unit controlled by the central processing unit to allow the driver of the vehicle to easily confirm a fuel amount currently remaining in the fuel tank in real time.

Here, before these steps are repeatedly performed, the central processing unit removes first received one TOF of the plurality of TOFs transferred in the measuring step (S10), includes new one TOF in the plurality of TOFs to configure a plurality of TOFs of a new cycle, and then calculate liquid level information.

In more detail, as illustrated in FIG. 14, step a) of FIG. 14 is an illustrative view illustrating the plurality of initial liquid level information calculated using the TOF references transferred form the reference sensor of the ultrasonic sensor unit and the TOF surface levels transferred from the measuring sensor of the ultrasonic sensor unit by the preset number of times for the preset time by the central processing unit.

Step b) of FIG. 14 is an illustrative view illustrating an example in which the plurality of initial liquid level information calculated by the central processing unit is arranged. As described above, two initial liquid level information corresponding to 0 is removed.

Step c) of FIG. 14 is an illustrative view illustrating an example in which in the case of excluding two initial liquid level information corresponding to 0, the number of initial liquid level information that remains is six, that is, an even number, and the final liquid level information of the fuel tank is thus calculated as the average value of the middle two initial liquid level information.

Step d) of FIG. 14 is an illustrative view illustrating an example of configuring a plurality of TOFs of a new cycle before calculating new liquid level information, in order to repeatedly calculate the liquid level information of the fuel tank. That is, the method for optimizing driving of an ultrasonic sensor is repeatedly performed by removing the first received one TOF and including the new one TOF.

In addition, the method for optimizing driving of an ultrasonic sensor according to an exemplary embodiment of the present invention may be configured to further include a self-diagnosing step of the ultrasonic sensor unit.

In the self-diagnosing step, a first self-diagnosing unit of the central processing unit may receive the plurality of TOFs transferred in the measuring step (S10) to decide validity of the TOFs transferred from the ultrasonic sensor unit.

In detail, the first self-diagnosing unit of the central processing unit may obtain a ringing time generated when the reference sensor transmits the ultrasonic signal and decide validity of TOF references of the reference sensor using the ringing time, and may obtain a ringing time generated when the measuring sensor transmits the ultrasonic signal and decide validity of TOF surface levels of the measuring sensor using the ringing time.

In the case in which the ringing time is the preset threshold or less, the first self-diagnosing unit self-diagnoses that a defect exists in the ultrasonic sensor unit itself to decide that the TOF references transferred from the reference sensor in which the defect exists or the TOF surface levels transferred from the measuring sensor in which the defect exists are not accurate.

However, in the method for optimizing driving of an ultrasonic sensor according to an exemplary embodiment of the present invention, it is preferable to calculate the liquid level information of the fuel tank and output the calculated liquid level information to the driver of the vehicle, regardless of a decision result of the self-diagnosing step.

In addition, the method for optimizing driving of an ultrasonic sensor according to an exemplary embodiment of the present invention may be configured to further include an additional self-diagnosing step of the ultrasonic sensor unit.

In the additional self-diagnosing step, a second self-diagnosing unit of the central processing unit decides validity of the final liquid level information calculated in the liquid level measuring step (S40) depending on the number of initial liquid level information that is excluded among the plurality of initial liquid level information in the correcting step (S30).

That is, it is preferable that the second self-diagnosing unit decides that the liquid level information of the fuel tank calculated by the central processing unit is invalid in the case in which the number of initial liquid level information excluded in the correcting step (S30) is half or more of the number of initially calculated initial liquid level information.

It is preferable to calculate the liquid level information of the fuel tank and output the calculated liquid level information to the driver of the vehicle, regardless of a decision result of the additional self-diagnosing step, similar to the self-diagnosing step.

However, it is preferable to control an operation state of an alarm unit so that the driver of the vehicle may recognize the inaccuracy of the liquid level information together with the calculated liquid level information of the fuel tank in the case in which it is decided in the self-diagnosing step that the TOFs of the ultrasonic sensor unit are not accurate, and it is preferable to control an operation state of the alarm unit so that the driver of the vehicle may recognize the inaccuracy of the liquid level information together with the calculated liquid level information of the fuel tank in the case in which it is decided in the additional self-diagnosing step that the final liquid level information calculated in the liquid level measuring step (S40) is not accurate.

<Second Exemplary Embodiment of Method for Optimizing Driving of Ultrasonic Sensor>

Figure 15:
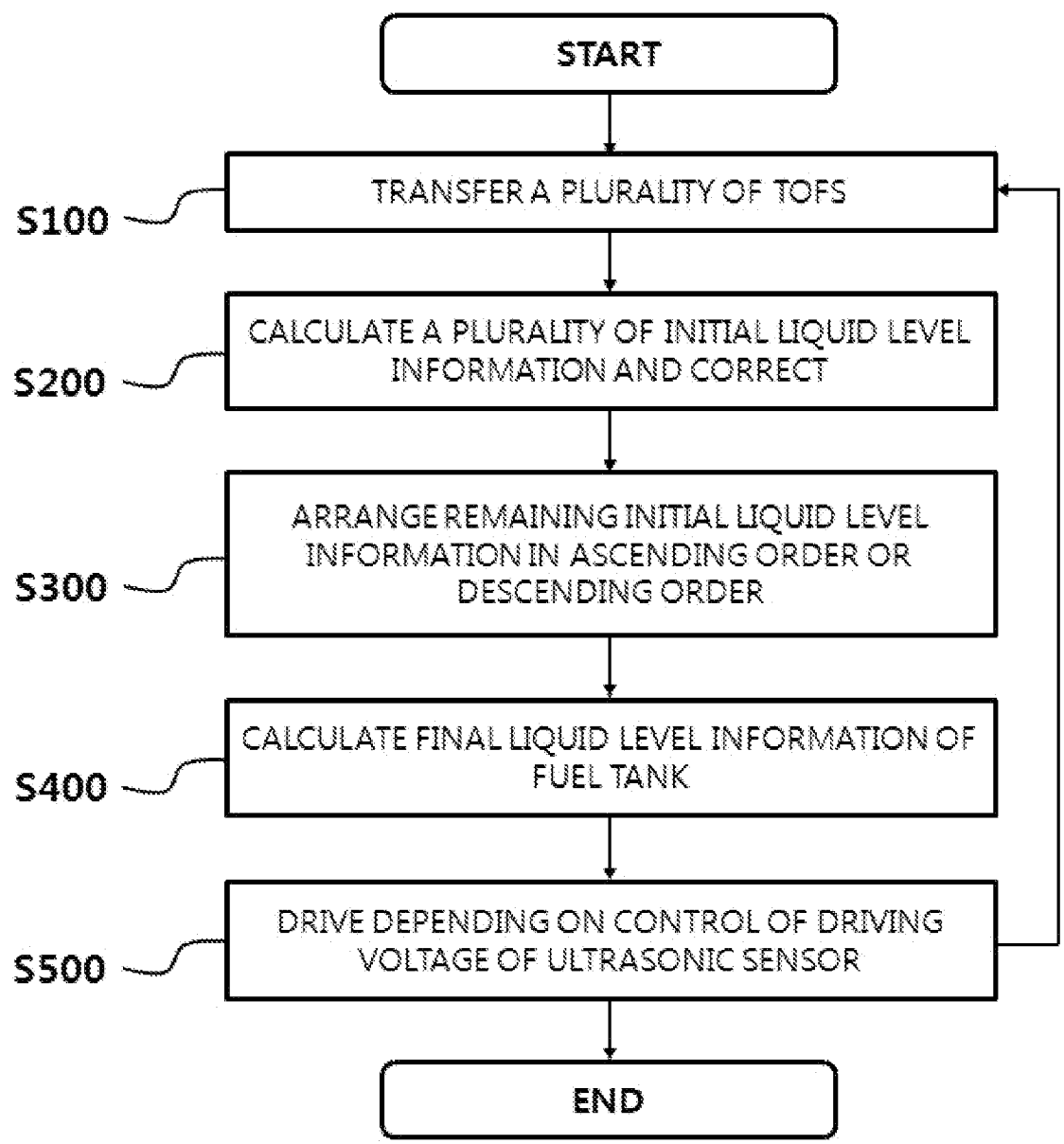
FIG. 15 is a flow chart illustrating a method for optimizing driving of an ultrasonic sensor according to another exemplary embodiment of the present invention.

The method for optimizing driving of an ultrasonic sensor according to another exemplary embodiment of the present invention may be configured to include a measuring step (S100), a correcting step (S200), an arranging step (S300), a liquid level measuring step (S400), and an ultrasonic driving control step (S500), as illustrated in FIG. 15.

The respective steps will be described in detail. In the measuring step (S100), the central processing unit may receive a plurality of TOFs transferred from the ultrasonic sensor unit.

Here, the plurality of TOFs are the TOF references transferred from the reference sensor of the ultrasonic sensor unit and the TOF surface levels transferred from the measuring sensor of the ultrasonic sensor unit by the preset number of times for the preset time, as described above.

In the correcting step (S200), the central processing unit calculates a plurality of initial liquid level information using the plurality of TOFs transferred in the measuring step (S100), and excludes initial liquid level information corresponding to a preset reference value or less or initial liquid level information corresponding to 0 among the plurality of initial liquid level information.

The initial liquid level information may be calculated by substituting the time-of-flight (TOF) reference transferred from the reference sensor and the TOF surface level transferred from the measuring sensor into the following Equation.

liquid level information=(reference distance)*(TOF reference/TOF surface level)

Here, the reference distance means a distance from the oscillating unit of the reference sensor to the reflecting unit that is formed in advance, and the liquid level information of the fuel tank may be calculated by obtaining the TOF reference for the reference distance that is already recognized, that is, the time required for the ultrasonic time to be reflected by and return from the reflecting unit, using the reference sensor to calculate a speed of the ultrasonic signal for the fuel (liquid) in the fuel tank and obtaining the TOF surface level, that is, the time required for the ultrasonic signal to be reflected by and return from the surface (the fuel surface) using the measuring sensor.

In the arranging step (S300), the central processing unit arranges initial liquid level information remaining after excluding the initial liquid level information corresponding to the preset reference value or less or the initial liquid level information corresponding to 0 among the plurality of initial liquid level information in the correcting step (S200), in an ascending order or a descending order.

In the liquid level measuring step (S400), the central processing unit calculates final liquid level information of the fuel tank using the plurality of initial liquid level information arranged in the arranging step (S300).

In detail, in the case in which the number of initial liquid level information remaining after the initial liquid level information corresponding to the preset reference value or less or the initial liquid level information corresponding to 0 is excluded among the plurality of initial liquid level information is an odd number, the central processing unit calculates the final liquid level information of the fuel tank as a middle value, and in the case in which the number of initial liquid level information remaining after the initial liquid level information corresponding to the preset reference value or less or the initial liquid level information corresponding to 0 is excluded among the plurality of initial liquid level information is an even number, the central processing unit calculates the final liquid level information of the fuel tank as an average value of the middle two TOFs.

In addition, it is preferable that the method for optimizing driving of an ultrasonic sensor according to another exemplary embodiment of the present invention further includes a displaying step performed after the liquid level measuring step (S400) is performed.

In the displaying step, the calculated liquid level information is transferred to the display unit to allow the driver of the vehicle to easily confirm (recognize) a fuel amount currently remaining in the fuel tank.

In the ultrasonic driving control step (S500), the central processing unit may control a driving voltage of the ultrasonic sensor unit using the final liquid level information calculated in the liquid level measuring step (S400).

In detail, it is preferable that the central processing unit controls the driving voltage to be a minimum value of an allowable driving voltage of the ultrasonic sensor unit in the case in which the calculated liquid level information of the fuel tank is a preset minimum fuel amount value or less and controls the driving voltage to be a maximum value of the allowable driving voltage of the ultrasonic sensor unit in the case in which the calculated liquid level information of the fuel tank exceeds the preset minimum fuel amount value.

In addition, the central processing unit may forcibly control a driving pulse width of the ultrasonic sensor unit while controlling the driving voltage to be the minimum value of the allowable driving voltage of the ultrasonic sensor unit in the case in which the calculated liquid level information of the fuel tank exceeds the preset minimum fuel amount value.

Here, the preset minimum fuel amount value is a value obtained by adding up a height of a general ultrasonic sensor itself and a height of a time in which a ringing time of the ultrasonic sensor is transferred, and is changed depending on a specification of the ultrasonic sensor, and a forcible control degree of the driving pulse width is changed depending on the specification of the ultrasonic sensor.

In addition, it is preferable that the central processing unit primarily forcibly controls the number of pulses of the ultrasonic sensor unit in the case in which the calculated liquid level information of the fuel tank exceeds the preset minimum fuel amount value and is a preset maximum fuel amount value or less, and secondarily forcibly controls the number of pulses of the ultrasonic sensor unit in the case in which the calculated liquid level information of the fuel tank exceeds the preset maximum fuel amount value.

Here, it is preferable that the preset maximum fuel amount value is differently set depending on a specification of the fuel tank, and the number of times of the forcible control of the number of pulses is also changed depending on the specification of the ultrasonic sensor.

In the method for optimizing driving of an ultrasonic sensor according to another exemplary embodiment of the present invention, after the ultrasonic driving control step (S500) is performed, the measuring step (S100), the correcting step (S200), the arranging step (S300), the liquid level measuring step (S400), and the ultrasonic driving control step (S500) may be repeatedly performed using the driving voltage of the ultrasonic sensor unit controlled by the central processing unit to allow the driver of the vehicle to easily confirm a fuel amount currently remaining in the fuel tank in real time.

Here, before these steps are repeatedly performed, the central processing unit removes first received one TOF of the plurality of TOFs transferred in the measuring step (S100), includes new one TOF in the plurality of TOFs to configure a plurality of TOFs of a new cycle, and then calculate liquid level information.

In addition, the method for optimizing driving of an ultrasonic sensor according to an exemplary embodiment of the present invention may be configured to further include a self-diagnosing step of the ultrasonic sensor unit.

In the self-diagnosing step, the first self-diagnosing unit of the central processing unit may receive the plurality of TOFs transferred in the measuring step (S100) to decide validity of the TOFs transferred from the ultrasonic sensor unit.

In detail, the first self-diagnosing unit of the central processing unit may obtain a ringing time generated when the reference sensor transmits the ultrasonic signal and decide validity of TOF references of the reference sensor using the ringing time, and may obtain a ringing time generated when the measuring sensor transmits the ultrasonic signal and decide validity of TOF surface levels of the measuring sensor using the ringing time.

In the case in which the ringing time is the preset threshold or less, the first self-diagnosing unit self-diagnoses that a defect exists in the ultrasonic sensor unit itself to decide that the TOF references transferred from the reference sensor in which the defect exists or the TOF surface levels transferred from the measuring sensor in which the defect exists are not accurate.

However, in the method for optimizing driving of an ultrasonic sensor according to an exemplary embodiment of the present invention, it is preferable to calculate the liquid level information of the fuel tank and output the calculated liquid level information to the driver of the vehicle, regardless of a decision result of the self-diagnosing step.

In addition, the method for optimizing driving of an ultrasonic sensor according to an exemplary embodiment of the present invention may be configured to further include an additional self-diagnosing step of the ultrasonic sensor unit.

In the additional self-diagnosing step, the second self-diagnosing unit of the central processing unit decides validity of the final liquid level information calculated in the liquid level measuring step (S400) depending on the number of initial liquid level information that is excluded among the plurality of initial liquid level information in the correcting step (S200).

That is, it is preferable that the second self-diagnosing unit decides that the liquid level information of the fuel tank calculated by the central processing unit is invalid in the case in which the number of initial liquid level information excluded in the correcting step (S200) is half or more of the number of initially calculated initial liquid level information.

It is preferable to calculate the liquid level information of the fuel tank and output the calculated liquid level information to the driver of the vehicle, regardless of a decision result of the additional self-diagnosing step, similar to the self-diagnosing step.

However, it is preferable to control an operation state of the alarm unit so that the driver of the vehicle may recognize the inaccuracy of the liquid level information together with the calculated liquid level information of the fuel tank in the case in which it is decided in the self-diagnosing step that the TOFs of the ultrasonic sensor unit are not accurate, and it is preferable to control an operation state of the alarm unit so that the driver of the vehicle may recognize the inaccuracy of the liquid level information together with the calculated liquid level information of the fuel tank in the case in which it is decided in the additional self-diagnosing step that the final liquid level information calculated in the liquid level measuring step (S400) is not accurate.

In other words, the method for optimizing driving of an ultrasonic sensor according to an exemplary embodiment of the present invention relate to a method for optimizing driving of an ultrasonic sensor capable of improving accuracy of measurement by minimizing the blind zone inevitably generated in the ultrasonic sensor, in measuring the liquid level of the fuel tank for a vehicle using the ultrasonic sensor.

The calculated liquid level information of the fuel tank for a vehicle is compared and decided depending on the preset reference value to control the driving state of the ultrasonic sensor, thereby making it possible to minimize the blind zone.

In the fuel tank for a vehicle according to the present invention, the fuel measure bar provided in the vertical direction in the fuel storing body in which the fuel combusted in the engine is stored and capable of measuring the fuel amount using the ultrasonic wave includes the first fuel measure bar fixed to the bottom surface of the fuel storing body and the second fuel measuring bar easily coupled to the first fuel measuring bar to easily enter the fuel storing body and exit from the fuel storing body.

In addition, in the fuel tank for a vehicle according to the present invention, the first fuel measure bar and the second fuel measuring bar constituting the fuel measuring bar may be fixed to and decoupled from each other by a simple component, and separation depending on coupling and replacement in the fuel storing body is thus easy.

What is claimed is:
1. A fuel tank for a vehicle, comprising:
a fuel storing body in which a fuel is stored; and
a fuel supplying unit including a fuel pump provided in the fuel storing body and supplying the fuel to an engine through a fuel channel connected to the engine and a fuel measuring bar formed in a vertical direction at one side of the fuel pump and measuring a fuel amount in the fuel storing body using an ultrasonic wave,
wherein the fuel measuring bar includes:
a first fuel measuring bar including a first fuel measuring bar body including a first fuel measuring path formed to be hollowed, and an ultrasonic sensor unit disposed at a lower end of the first fuel measuring bar body, including an ultrasonic sensor, formed to be fixed to a bottom surface of the fuel storing body;
a second fuel measuring bar including a second fuel measuring bar body having a lower end formed to be coupled to an upper end of the first fuel measuring bar body and including a second fuel measuring path hollowed so as to be in communication with the first fuel measuring path and forming a fuel measuring path by coupling to the first fuel measuring path, and
a decoupling space is formed above the second fuel measuring bar to decouple and couple the second fuel measuring bar in the fuel storing body, the decoupling space having a vertical length greater than a length of a lower insertion portion of the second fuel measuring bar body.

2. The fuel tank for a vehicle of claim 1, wherein the first fuel measuring bar includes a fitting portion formed at the upper end of the first fuel measuring bar body and including fitting grooves formed in an outer peripheral surface of the first fuel measuring path, and
the second fuel measuring bar includes a sliding portion formed at the lower end of the second fuel measuring bar body and including sliding protrusions formed on an outer peripheral surface of the second fuel measuring path so as to be fitted into the fitting grooves.

3. The fuel tank for a vehicle of claim 2, wherein the sliding portion has two or more sliding protrusions formed at both sides thereof in a horizontal direction so as to protrude in a downward direction, and the fitting grooves of the fitting portion have a shape corresponding to that of the sliding protrusions.

4. The fuel tank for a vehicle of claim 1, wherein the fuel supplying unit further includes a fixing portion including a fuel pump fixing portion and a fuel measuring bar fixing portion, the fuel pump fixing portion being formed at one side of the fuel pump facing the fuel measuring bar, and the fuel measuring bar fixing portion being formed at one side of the second fuel measuring bar facing the fuel pump fixing portion so as to be fixed to the fuel pump fixing portion.

5. The fuel tank for a vehicle of claim 1, wherein the fuel measuring path has a predetermined angle so that a diameter thereof in a horizontal direction becomes wide toward an upward direction.

6. The fuel tank for a vehicle of claim 1, wherein the fuel supply unit further includes a bracket portion including a first bracket portion and a second bracket portion, the first bracket portion including a first bracket formed on the bottom surface of the fuel storing body so that a lower end of the fuel pump is fixed thereto, and the second bracket portion including a second bracket formed on the bottom surface of the fuel storing body so that a lower end of the ultrasonic sensor unit is fixed thereto.

7. The fuel tank for a vehicle of claim 6, wherein the first bracket portion includes a first bracket auxiliary portion extended in an upward direction so as to surround the fuel pump, and the second bracket portion includes a second bracket auxiliary portion extended in the upward direction so as to surround the ultrasonic sensor unit.

8. A fuel tank for a vehicle, comprising:
a fuel storing body in which a fuel is stored; and
a fuel supplying unit including a fuel pump provided in the fuel storing body and supplying the fuel to an engine through a fuel channel connected to the engine and a fuel measuring bar formed in a vertical direction at one side of the fuel pump and measuring a fuel amount in the fuel storing body using an ultrasonic wave,
wherein the fuel measuring bar includes:
a first fuel measuring bar including a first fuel measuring bar body including a first fuel measuring path formed to be hollowed, and an ultrasonic sensor unit disposed at a lower end of the first fuel measuring bar body, including an ultrasonic sensor, formed to be fixed to a bottom surface of the fuel storing body;
a second fuel measuring bar including a second fuel measuring bar body having a lower end formed to be coupled to an upper end of the first fuel measuring bar body and including a second fuel measuring path hollowed so as to be in communication with the first fuel measuring path and forming a fuel measuring path by coupling to the first fuel measuring path,
the fuel supplying unit further includes a fixing portion including a fuel pump fixing portion and a fuel measuring bar fixing portion, the fuel pump fixing portion being formed at one side of the fuel pump facing the fuel measuring bar, and the fuel measuring bar fixing portion being formed at one side of the second fuel measuring bar facing the fuel pump fixing portion so as to be fixed to the fuel pump fixing portion,
the fuel pump fixing portion includes a guide path formed in the vertical direction and a fixing jaw formed at a lower side of the guide path to protrude toward the fuel measuring bar, and
the fuel measuring bar fixing portion includes a tongs body having a shape corresponding to that of the guide path to be fitted into the guide path and a fixing protrusion formed at a distal end of the tongs body and formed to be fixed to the fixing jaw.

9. A fuel tank for a vehicle, comprising:
a fuel storing body in which a fuel is stored; and
a fuel supplying unit including a fuel pump provided in the fuel storing body and supplying the fuel to an engine through a fuel channel connected to the engine and a fuel measuring bar formed in a vertical direction at one side of the fuel pump and measuring a fuel amount in the fuel storing body using an ultrasonic wave,
wherein the fuel measuring bar includes:
a first fuel measuring bar including a first fuel measuring bar body including a first fuel measuring path formed to be hollowed, and an ultrasonic sensor unit disposed at a lower end of the first fuel measuring bar body, including an ultrasonic sensor, formed to be fixed to a bottom surface of the fuel storing body;
a second fuel measuring bar including a second fuel measuring bar body having a lower end formed to be coupled to an upper end of the first fuel measuring bar body and including a second fuel measuring path hollowed so as to be in communication with the first fuel measuring path and forming a fuel measuring path by coupling to the first fuel measuring path,
the first fuel measuring bar includes a fitting portion formed at the upper end of the first fuel measuring bar body and including fitting grooves formed in an outer peripheral surface of the first fuel measuring path,
the second fuel measuring bar includes a sliding portion formed at the lower end of the second fuel measuring bar body and including sliding protrusions formed on an outer peripheral surface of the second fuel measuring path so as to be fitted into the fitting grooves, and
the fitting portion includes an elastic portion formed on a lower surface of the fitting groove and made of an elastic material.

* * * * *